(12) United States Patent
Dohta

(10) Patent No.: US 9,105,114 B2
(45) Date of Patent: Aug. 11, 2015

(54) STORAGE MEDIUM STORING IMAGE PROCESSING PROGRAM AND IMAGE PROCESSING APPARATUS

(75) Inventor: Takuhiro Dohta, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 1121 days.

(21) Appl. No.: 11/882,010

(22) Filed: Jul. 30, 2007

(65) Prior Publication Data

US 2008/0303812 A1 Dec. 11, 2008

(30) Foreign Application Priority Data

Jun. 11, 2007 (JP) .................................. 2007-154114

(51) Int. Cl.
*G06T 15/00* (2011.01)
*G06T 7/00* (2006.01)
*G06T 15/02* (2011.01)

(52) U.S. Cl.
CPC ............... *G06T 15/00* (2013.01); *G06T 7/0083* (2013.01); *G06T 7/0085* (2013.01); *G06T 15/02* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,747,642 B1 | 6/2004 | Yasumoto | |
| 2003/0222875 A1 | 12/2003 | Kawakami et al. | |

FOREIGN PATENT DOCUMENTS

| | | |
|---|---|---|
| EP | 1 519 317 | 3/2005 |
| JP | 07-037105 | 2/1995 |
| JP | 2000-251094 | 9/2000 |
| JP | 2001-084404 | 3/2001 |
| JP | 2001-126086 | 5/2001 |
| JP | 2001-134779 | 5/2001 |
| JP | 2003-256865 | 9/2003 |

OTHER PUBLICATIONS

Takafumi Saito and Tokiichiro Takahashi, "Comprehensible Rendering of 3-D Shapes", Aug. 10, 1990, ACM, Computer Graphics, vol. 24, No. 4, pp. 197-206.*
Marc Nienhaus and Juergen Doellner, "Edge-Enhancement—An Algorithm for Real-Time Non-Photorealistic Rendering", Feb. 7, 2003, Union Agency—Science Press, Journal of WSCG, vol. 11, No. 1.*
Lijun Ding and Ardeshir Goshtasby, "On the Canny Edge Detector", Mar. 2001, Elsevier Science Ltd., Pattern Recognition, vol. 34, Issue 3, pp. 721-725.*

(Continued)

*Primary Examiner* — Daniel Hajnik
*Assistant Examiner* — Robert Bader
(74) *Attorney, Agent, or Firm* — Nixon & Vanderhye P.C.

(57) ABSTRACT

A game apparatus generates an image of a three-dimensional virtual space as viewed from a predetermined viewpoint, an object being provided in the three-dimensional virtual space. Next, the game apparatus obtains a depth value (Z value) indicating a depth from the viewpoint in a line-of-sight direction in the three-dimensional virtual space for each pixel of the image. Further, the game apparatus detects a pixel corresponding to a contour of the object based on the depth value. Specifically, a plurality of pixels are specified as reference pixels. It is determined whether or not a pixel of interest corresponds to a contour, based on a change level of differences in depth value between the pixel of interest and the reference pixels.

23 Claims, 22 Drawing Sheets

(56) References Cited

OTHER PUBLICATIONS

Bernt Schiele and James L Crowley, "Object Recognition Using Multidimensional Receptive Field Histograms", Apr. 18, 1996, Proceedings of the 4th European Conference on Computer Vision—vol. 1, 610-619.*

Eugene Lapidous and Guofang Jiao, "Optimal Depth Buffer for Low-Cost Graphics Hardware", Aug. 9, 1999, Proceedings of the ACM SIGGRAPH/EUROGRAPHICS workshop on Graphics Hardware, pp. 67-73.*

Azriel Rosenfeld and Mark Thurston, "Edge and Curve Detection for Visual Scene Analysis", May 1971, IEEE, IEEE Transactions on Computers, vol. C-20, No. 5, pp. 562-569.*

Werner Frei and Chung-Ching Chen, "Fast Boundary Detection: A Generalization and a New Algorithm", Oct. 1977, IEEE, IEEE Transactions on Computers, vol. C-76, No. 10, pp. 988-998.*

Bill Green, "Canny Edge Detection Tutorial", 2002, www.pages.drexel.edu/weg22/cantut.html, retreived from http://sites.google.com/site/setiawanhadi2/1CannyEdgeDetectionTutorial.pdf on Aug. 7, 2014.*

Per H. Christensen, "Contour Rendering", Feb. 1999, ACM, Computer Graphics, vol. 33, Issue 1, pp. 58-61.*

Robert Collins, "Lecture 05: Edge Detection", Fall 2007, Penn State University, retrieved from http://www.cse.psu.edu/~rcollins/CSE486/ on Mar. 11, 2015.*

Diaz et al., "A Genetic Algorithm to Segment Range Image by Edge Detection", 7 pages, 2005, IEEE.

Kim et al., "Facial Feature Localization from 3D Face Image using Adjacent Depth Differences", Journal of Kiss B, Software and Applications, Seoul, KR, vol. 31, No. 5, May 2004, 8 pages.

Jan. 11, 2013 Notice of Reasons for Rejection for JP2007-154114, 4 pages.

* cited by examiner

STORAGE MEDIUM STORING IMAGE PROCESSING PROGRAM AND IMAGE PROCESSING APPARATUS

CROSS REFERENCE TO RELATED APPLICATION

The disclosure of Japanese Patent Application No. 2007-154114, filed Jun. 11, 2007, is incorporated herein by reference.

TECHNICAL FIELD

The present invention relates to an image processing program and an image processing apparatus. More particularly, the present invention relates to an image processing program and an image processing apparatus for executing image processing to generate an image of a three-dimensional virtual space.

BACKGROUND AND SUMMARY

Conventionally, in order to generate a cartoon-like (comic-like) image by three-dimensional image processing, a process of drawing an outline (contour) of a model formed of polygons has been proposed. For example, in image processing apparatuses described in Patent Documents (Japanese Patent Laid-Open Publications Nos. 2000-251094, 2001-126086 and 2001-084404), a model indicating a character or the like (basic model) and an enlarged model for drawing an outline are used. The enlarged model is obtained by enlarging the basic model and is arranged to encompass the basic model. Also, the normal vectors of polygons constituting the enlarged model are reversed with respect to the normal vectors of the basic model. Specifically, the normal vectors of the basic model are set to be directed outward while the normal vectors of the enlarged model are set to be directed inward. Thereby, when the basic model and the enlarged model are drawn by three-dimensional image processing using hidden surface removal or the like, only a portion(s) of the enlarged model which is located behind the basic model as viewed from a viewpoint and outside the edge of the basic model is drawn. Therefore, the enlarged model may be, for example, filled with black or the like, thereby making it possible to generate an image with an outline attached to the outside of the basic model.

In the image processing apparatuses of Patent Documents above, two models, i.e., the basic model and the enlarged model, are required to draw one character, so that additional processes are required as compared to when one model is used for one character. Therefore, the larger the number of polygons constituting one model, the more the processing load. Also, the larger the number of models to be drawn, the more the processing load.

Also, in the image processing apparatuses of Patent Documents above, a portion of the enlarged model outside the basic model becomes an outline. Therefore, the thickness of the outline in the generated image varies depending on the distance from the viewpoint to the model. Therefore, if the distance from a camera to the model is large, the outline may be too thin to be visually recognized. Conversely, if the distance is excessively small, the outline may be excessively thick.

SUMMARY OF THE INVENTION

Therefore, a feature of the present invention is to provide an image processing program and an image processing apparatus capable of detecting a contour of an image of a three-dimensional space with a stable load while preventing the processing load from excessively increasing, depending on the situation.

The present invention has the following features. Note that reference numerals, additional descriptions and the like inside parentheses in this section indicate correspondence to embodiments described below for the sake of easy understanding, and are not intended to be limiting in any way.

In a first aspect, a computer readable storage medium is provided which stores an image processing program (game program 60) which causes a computer (CPU 10 and/or GPU 11b) to execute a process of generating an image of a three-dimensional virtual space. The image processing program causes the computer to execute an image generating step (S2), a depth value obtaining step (S11), and a contour detecting step (S3). In the image generating step, the computer generates an image of a three-dimensional virtual space as viewed from a predetermined viewpoint, an object being provided in the three-dimensional virtual space. In the depth value obtaining step, the computer obtains a depth value (Z value) indicating a depth from the viewpoint in a line-of-sight direction in the three-dimensional virtual space for each pixel of the image. In the contour detecting step, the computer detects a pixel corresponding to a contour of the object based on the depth value.

In a second aspect, the image processing program may cause the computer to further execute a pixel-of-interest selecting step (S21) of selecting a pixel of interest which is to be subjected to a process of determining whether or not the pixel corresponds to a contour, from all pixels of the image. In this case, the contour detecting step includes a reference pixel specifying step (S22) and a contour determining step (S13, S14). In the reference pixel specifying step, the computer specifies at least one reference pixel having a predetermined positional relationship with respect to the pixel of interest. In the contour determining step, the computer determines whether or not the pixel of interest corresponds to a contour, based on a difference (Zdif1) in depth value between the pixel of interest and the reference pixel.

In a third aspect, in the reference pixel specifying step, the computer may specify a plurality of pixels as reference pixels. In this case, in the contour determining step, the computer determines whether or not the pixel of interest corresponds to a contour, based on a change level (Zdif2) of differences in depth value between the pixel of interest and the plurality of reference pixels and optionally between the plurality of reference pixels themselves.

In a fourth aspect, in the reference pixel specifying step, the computer may specify as reference pixels at least two pixels positioned symmetric about the pixel of interest. In this case, in the contour determining step, the computer determines whether or not the pixel of interest corresponds to a contour, based on a change level of differences in depth value between the pixel of interest and the reference pixels.

In a fifth aspect, in the contour determining step, the computer may use as the change level a difference between an average of the depth values of the reference pixels and the depth value of the pixel of interest.

In a sixth aspect, in the contour determining step, when a difference obtained by subtracting the depth value of the pixel of interest from the average of the depth values of the reference pixels is larger than a predetermined value, the computer may determine that the pixel of interest corresponds to a contour.

In a seventh aspect, in the contour determining step, when a difference obtained by subtracting the average of the depth values of the reference pixels from the depth value of the pixel of interest is larger than a predetermined value, the computer may determine that the pixel of interest corresponds to a contour.

In an eighth aspect, in the contour determining step, when the absolute value of a difference between the average of the depth values of the reference pixels and the depth value of the pixel of interest is larger than a predetermined value, the computer may determine that the pixel of interest corresponds to a contour.

In a ninth aspect, in the contour determining step, the computer may use as the change level a ratio of the average of the depth values of the reference pixels to the depth value of the pixel of interest.

In a tenth aspect, in the contour determining step, for a pixel corresponding to a contour, the computer may calculate a contour value (first to third contour values) indicating a shade of the contour, depending on the change level. In this case, the image processing program causes the computer to further execute a contour image drawing step (S5) of drawing the contour with the shade corresponding to the contour value for a pixel which has been determined to correspond to the contour in the contour determining step.

In an eleventh aspect, in the reference pixel specifying step, the computer may specify a plurality of sets of pixels, each set including two pixels positioned symmetric about the pixel of interest, so that directions from the pixel of interest to the pixels of each set are different from each other. In this case, in the contour determining step, the computer calculates the change level for each pixel set, and based on the calculated change levels, determines whether or not the pixel of interest corresponds to a contour.

In a twelfth aspect, in the reference pixel specifying step, the computer may specify as reference pixels at least two pixels positioned symmetric about the pixel of interest and arranged in a lengthwise direction of the image and two pixels positioned symmetric about the pixel of interest and arranged in a widthwise direction of the image.

In a thirteenth aspect, in the reference pixel specifying step, the computer may specify as reference pixels at least two pixels positioned symmetric about the pixel of interest and arranged in a slanting direction of the image.

In a fourteenth aspect, the contour determining step may include a first determination step (S13, S14) and a second determining step (S15). In the first determination step, the computer calculates the change level for each pixel set, and based on the calculated change levels, preliminarily determining whether or not the pixel of interest corresponds to a contour for each pixel set. In the second determining step, the computer determines whether or not the pixel of interest corresponds to a contour, based on a result of the determination by the first determination step.

In a fifteenth aspect, in the first determination step, the computer may use conditions varying among the sets of reference pixels, as determination conditions for preliminarily determining whether or not the pixel of interest corresponds to a contour.

In a sixteenth aspect, in the reference pixel specifying step, the computer may specify reference pixels so that a distance (width w) from the pixel of interest to a reference pixel varies among the sets of reference pixels.

In a seventeenth aspect, the image processing program may cause the computer to further execute a contour image drawing step (S5) of drawing the image generated in the image generating step, and performing a drawing process with respect to the pixel detected in the contour detecting step using a predetermined color.

In an eighteenth aspect, the image processing program may cause the computer to further execute a contour image generating step of generating an image of only the contour detected in the contour detecting step.

In a nineteenth aspect, the image processing program may cause the computer to further execute a process executing step of executing an antialiasing process with respect to a pixel in an area determined in accordance with the pixel detected by the contour detecting step.

In a twentieth aspect, in the depth value obtaining step, the computer may obtain a Z value stored in a Z buffer as the depth value.

In a twenty-first aspect, the depth value may represent a position in a depth direction from the viewpoint to an object drawn in a pixel in the virtual space.

In a twenty-second aspect, in the depth value obtaining step, the computer may obtain the depth value by converting a Z value stored in a Z buffer (step S12).

In a twenty-third aspect, in the depth value obtaining step, the computer may obtain a value stored in a W buffer as the depth value.

According to the first aspect, a process of detecting a contour in an image of a three-dimensional space can be performed using the image itself. Thereby, the contour can be detected from the image without preparing a three-dimensional object (model) for adding the contour. Therefore, according to the first aspect, it is possible to prevent the processing amount from increasing depending on the situation, such as the number of objects or the like, as in conventional techniques, thereby making it possible to avoid addition of a process to the computer.

According to the second aspect, based on a difference in depth value between a pixel of interest and a reference pixel, it is determined whether or not the pixel of interest corresponds to a contour. Therefore, a contour can be detected by a simple method and with high speed.

According to the third aspect, based on a change level of differences in depth value between a pixel of interest and a plurality of reference pixels, it is determined whether or not the pixel of interest corresponds to a contour. Therefore, more correct determination can be achieved than when a difference in depth value as it is simply used in determination.

According to the fourth aspect, at least two pixels which are positioned symmetric about a pixel of interest are specified as reference pixels, a change level of differences in depth value between a pixel of interest and pixels on opposite sides of the pixel of interest can be calculated. Thereby, it can be determined whether or not the pixel of interest corresponds to a contour.

According to the fifth aspect, a difference between an average of the depth values of reference pixels and the depth value of a pixel of interest is used as the change level. Therefore, the change level can be easily calculated.

According to the sixth aspect, as a condition for determining that a pixel of interest corresponds to a contour, a condition that a difference obtained by subtracting the depth value of a pixel of interest from an average of the depth values of reference pixels is larger than a predetermined value, is used. Thereby, when an object has a portion whose cross-section is convex at a pixel of interest, the portion can be detected as a contour.

According to a seventh aspect, as a condition for determining that a pixel of interest corresponds to a contour, a condition that a difference obtained by subtracting an average of the depth values of reference pixels from the depth value of a pixel of interest is larger than a predetermined value, is used.

Thereby, when an object has a portion whose cross-section is concave at a pixel of interest, the portion can be detected as a contour.

According to an eighth aspect, as a condition for determining that a pixel of interest corresponds to a contour, a condition that the absolute value of a difference between subtracting an average of the depth values of reference pixels from the depth value of a pixel of interest is larger than a predetermined value, is used. Thereby, when an object has a portion whose cross-section is convex or concave at a pixel of interest, the portion can be detected as a contour.

According to the ninth aspect, a ratio of an average of the depth values of reference pixels to the depth value of a pixel of interest is used as the change level. Therefore, the change level can be easily calculated.

According to the tenth aspect, a contour can be drawn with a shade varying depending on the change level. Here, an object may be moved or a virtual camera may be moved or rotated in the three-dimensional space, so that the orientation of the object may vary with respect to the line-of-sight of the virtual camera. According to the tenth aspect, in such a case, by executing the contour image drawing step every time when a three-dimensional image is newly produced, the change level value is changed, depending on a change in the orientation, so that the color shade of the contour can be changed. Therefore, when a new contour is displayed as a result from changing of the orientation of the object, a contour having a lighter shade is initially displayed, and thereafter, the color shade of the contour gradually increases. Thus, according to the tenth aspect, when a contour is newly drawn, the contour can be expressed to gradually appear, but not suddenly emerge, so that the contour can be displayed without a sense of discomfort.

According to the eleventh to thirteenth aspects, a contour detecting process is performed with respect to a plurality of directions in a three-dimensional image, thereby making it possible to detect contours extending in various directions.

According to the fourteenth aspect, a contour detecting process is performed with respect to each of a plurality of directions in a three-dimensional image, thereby making it possible to more correctly detect contours extending in various directions.

According to the fifteenth and sixteenth aspects, a determination result of a contour determining step varies depending on the reference pixel set. Therefore, a contour may or may not be easily detected, depending on the direction at a pixel. Therefore, a contour can be detected as being thick in one direction or as being thin in another direction. Therefore, for example, when a detected contour is drawn, the contour can be represented as if it were drawn using a pen, such as a marker pen, which provides a line whose thickness varies depending on the drawing direction.

According to the seventeenth aspect, an image in which a contour is added to an image of a three-dimensional space can be generated and displayed. Also, according to the eighteenth aspect, an image in which only a contour(s) of an image of a three-dimensional space is displayed can be generated and displayed. Further, according to the seventeenth and eighteenth aspects, since a three-dimensional object for adding a contour is not used, the thickness of a detected contour does not depend on a distance between a viewpoint and an object. Therefore, according to the seventeenth and eighteenth aspects, it is possible to prevent a contour from becoming too thin to be visually recognized due to a large distance from a camera to an object, and it is also possible to prevent a contour from becoming too thick due to an excessively short distance.

Therefore, a contour can be drawn with a line width which does not depend on the distance.

According to the nineteenth aspect, an antialiasing process is performed with respect to an area which is determined, depending on a pixel which has been detected as corresponding to a contour. Therefore, the antialiasing process can be efficiently performed, so that aliasing can be reduced at a contour portion of an image.

According to the twentieth, twenty-second and twenty-third aspects, a Z value stored in a Z buffer or a value stored in a W buffer is used as a depth value, thereby making it possible to easily obtain the depth value. According to the twenty-first aspect, a depth value indicates a distance from a viewpoint to an object drawn in a pixel in a virtual space. Therefore, a process of detecting a contour using the depth value can be correctly performed.

These and other features, aspects and advantages will become more apparent from the following detailed description when taken in conjunction with the accompanying drawings.

DETAILED DESCRIPTION (Whole Configuration of Game System)

Figure 1:
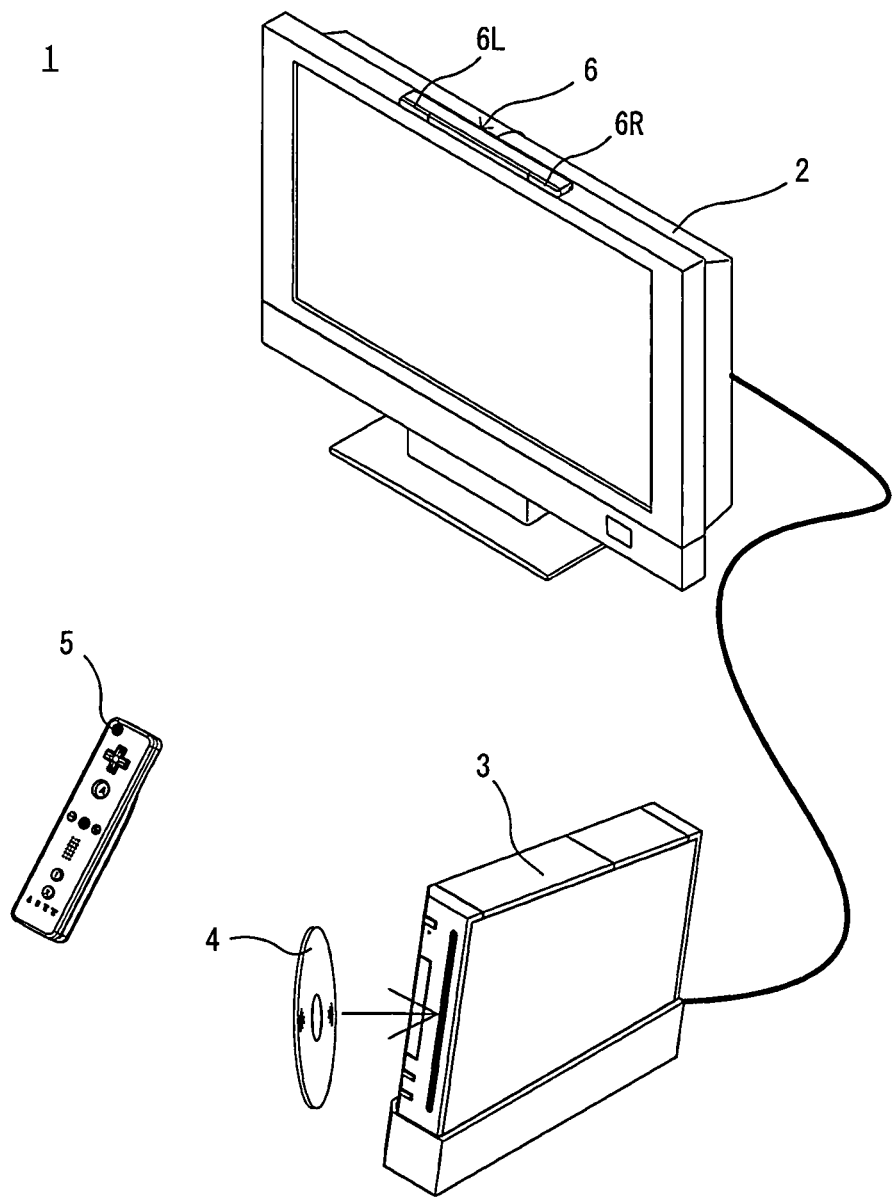
FIG. 1 is an external view of a game system 1.

A game system 1 including a game apparatus will be described as an exemplary image processing apparatus according to an embodiment, with reference to FIG. 1. FIG. 1 is an external view of the game system 1. Hereinafter, the game apparatus and a game program of the embodiment will be described, where the game apparatus is a stationary game apparatus as an example. In FIG. 1, the game system 1 includes a television set (hereinafter simply referred to as a "television") 2, a game apparatus 3, an optical disc 4, a controller 5, and a marker unit 6. In the game system 1, the game apparatus 3 executes a game process based on a game operation using the controller 5.

The optical disc 4 which is an exemplary information storing medium which is changeable with respect to the game apparatus 3 which is an exemplary information processing apparatus and from which data can be readout is detachably loaded into the game apparatus 3. A game program (an exemplary image processing program) to be executed in the game apparatus 3 is stored on the optical disc 4. On a front surface of the game apparatus 3, a slot through which the optical disc 4 is loaded or unloaded is provided. The game apparatus 3 executes a game process by reading and executing a game program stored on the optical disc 4 which has been loaded through the slot.

The television 2 (an exemplary display apparatus) is connected via a connection cord to the game apparatus 3. The television 2 displays a game image which is obtained as a result of the game process executed in the game apparatus 3. The marker unit 6 is provided in the vicinity of the screen of the television 2 (on an upper side of the screen in FIG. 1). The marker unit comprises two markers 6R and 6L at both ends thereof. Specifically, the marker 6R comprises one or more infrared LEDs which output infrared light toward the front of the television 2 (the same is true of the marker 6L). The marker unit 6 is connected to the game apparatus 3, so that the game apparatus 3 can control ON/OFF of each infrared LED included in the marker unit 6.

The controller 5 is an input device which inputs operation data indicating an operation performed with respect to the controller 5, to the game apparatus 3. The controller 5 and the game apparatus 3 are connected via wireless communication. In this embodiment, for example, the Bluetooth® technology is used for wireless communication between the controller 5 and the game apparatus 3. Note that, in another embodiment, the controller 5 and the game apparatus 3 may be connected via wired communication.

(Internal Configuration of Game Apparatus)

Figure 2:
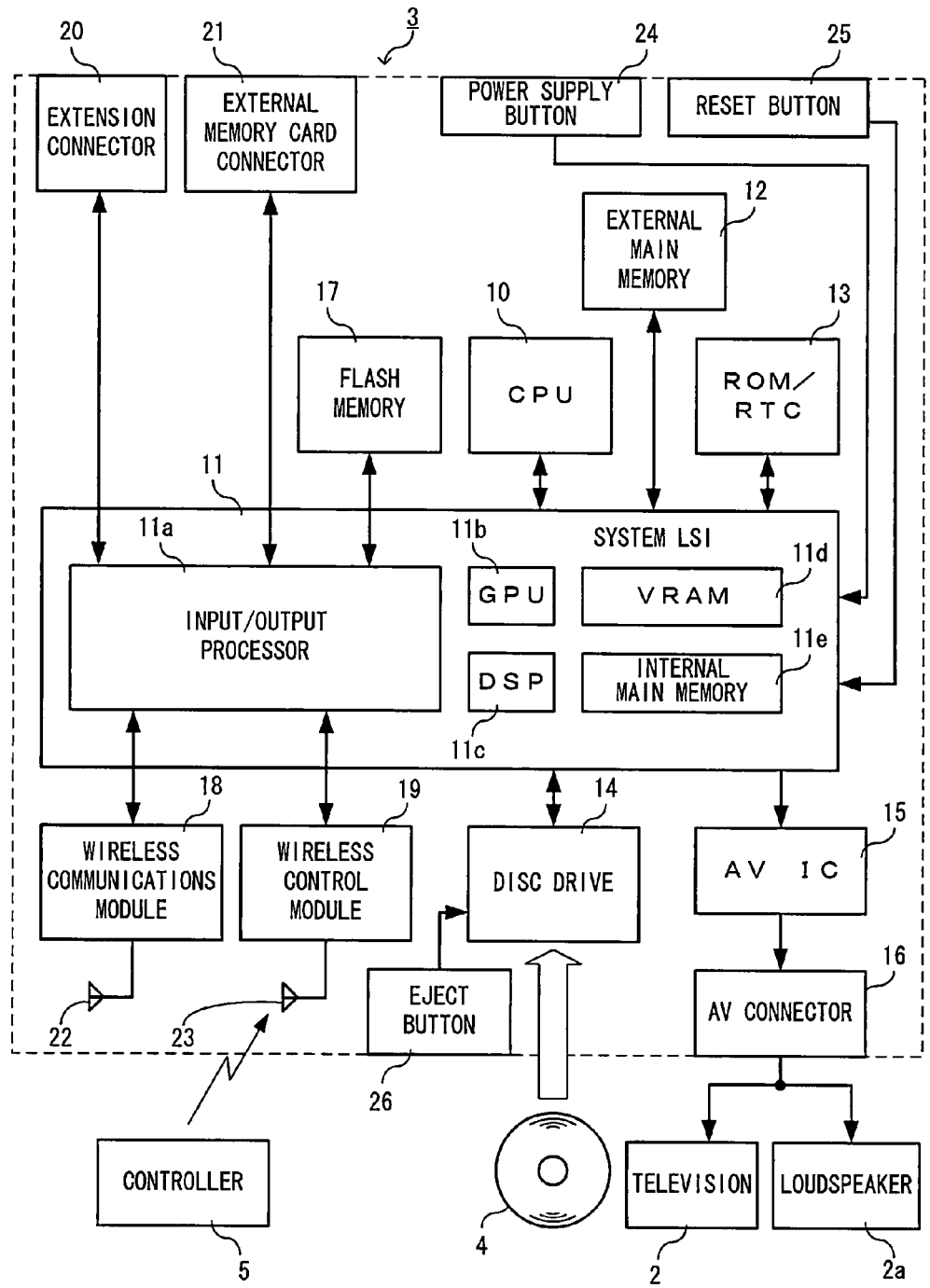
FIG. 2 is a functional block diagram of a game apparatus 3.

Next, a configuration of the game apparatus 3 will be described with reference to FIG. 2. FIG. 2 is a functional block diagram of the game apparatus 3. The game apparatus 3 has a CPU 10, a system LSI 11, an external main memory 12, a ROM/RTC 13, a disc drive 14, an AV-IC 15, and the like.

The CPU 10 executes a game process by executing a game program stored on the optical disc 4, and serves as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 controls data transfer between each part connected thereto, generation of an image to be displayed, acquisition of data from an external apparatus, and the like. An internal configuration of the system LSI 11 will be described below. The volatile external main memory 12 stores a program, such as a game program read out from the optical disc 4, a game program read out from a flash memory 17, or the like, or stores various data, i.e., is used as a work area or a buffer area of the CPU 10. The ROM/RTC 13 has a ROM (so-called boot ROM) which stores a boot program for starting up the game apparatus 3, and a clock circuit (RTC: Real Time Clock) which counts time. The disc drive 14 reads out program data, texture data or the like from the optical disc 4, and writes the read data into an internal main memory 11e or the external main memory 12.

The system LSI 11 also comprises an input/output processor 11a, a GPU (Graphics Processor Unit) 11b, a DSP (Digital Signal Processor) 11c, a VRAM 11d, and the internal main memory 11e. The parts 11a to 11e are interconnected via an internal bus (not shown).

The GPU 11b, which is a part of a drawing means, generates an image in accordance with a graphics command (drawing instruction) from the CPU 10. The VRAM 11d stores data (polygon data, texture data, etc.) required for the GPU 11b to execute the graphics command. When an image is generated, the GPU 11b produces image data using data stored in the VRAM 11d.

The DSP 11c, which functions as an audio processor, generates audio data using sound data or sound waveform (tone color) data stored in the internal main memory 11e or the external main memory 12.

The image data and audio data thus generated are read out by the AV-IC 15. The AV-IC 15 outputs the read image data via an AV connector 16 to the television 2 and the read audio data to a loudspeaker 2a included in the television 2. Thereby, sound is output from the loudspeaker 2a while an image is displayed on the television 2.

The input/output processor (I/O processor) 11a transmits and receives data to and from parts connected thereto, and also downloads data from an external apparatus. The input/output processor 11a is connected to the flash memory 17, a wireless communications module 18, a wireless controller module 19, an extension connector 20, and a memory card connector 21. An antenna 22 is connected to the wireless communications module 18, and an antenna 23 is connected to the wireless controller module 19.

The input/output processor 11a is connected via the wireless communications module 18 and the antenna 22 to a network, which allows the input/output processor 11a to communicate with other game apparatuses or other servers connected to the network. The input/output processor 11a regularly accesses the flash memory 17 to detect the presence or absence of data which needs to be transmitted to the network, and when such data is present, outputs the data via the wireless communications module 18 and the antenna 22 to the network. The input/output processor 11a also receives data transmitted from another game apparatus or data downloaded from a download server, via the network, the antenna 22 and the wireless communications module 18, and stores the received data into the flash memory 17. The CPU 10 executes a game program to read out data from the flash memory 17 and uses the data in the game program. In the flash memory 17, save data (result data or intermediate data of a game) of a game which a user plays using the game apparatus 3 may be stored in addition to data which the game apparatus 3 transmits and receives to and from other game apparatuses or other servers.

The input/output processor 11a also receives operation data transmitted from the controller 5, via the antenna 23 and the wireless controller module 19, and stores (temporarily stores) the data into a buffer area of the internal main memory 11e or the external main memory 12.

Further, the extension connector 20 and the memory card connector 21 are connected to the input/output processor 11a. The extension connector 20 is a connector for interface, such as USB or SCSI, to which a medium (an external storage medium, etc.), a peripheral apparatus (another controller, etc.), or a wired communications connector may be connected. Communication with the network can be achieved via the wired communications connector instead of the wireless communications module 18. The memory card connector 21 is a connector for connecting an external storage medium, such as a memory card or the like. For example, the input/output processor 11a can access an external storage medium via the extension connector 20 or the memory card connector 21 to save data into or read data from the external storage medium.

The game apparatus 3 comprises a power button 24, a reset button 25, and an eject button 26. The power button 24 and the reset button 25 are connected to the system LSI 11. When the power button 24 is turned ON, power is supplied via an AC adaptor (not shown) to each part of the power the game apparatus 3. When the reset button 25 is pressed, the system LSI 11 restarts up the boot program of the game apparatus 3. The eject button 26 is connected to the disc drive 14. When the eject button 26 is pressed, the optical disc 4 is ejected from the disc drive 14.

(Configuration Of Controller 5)

Figure 3:
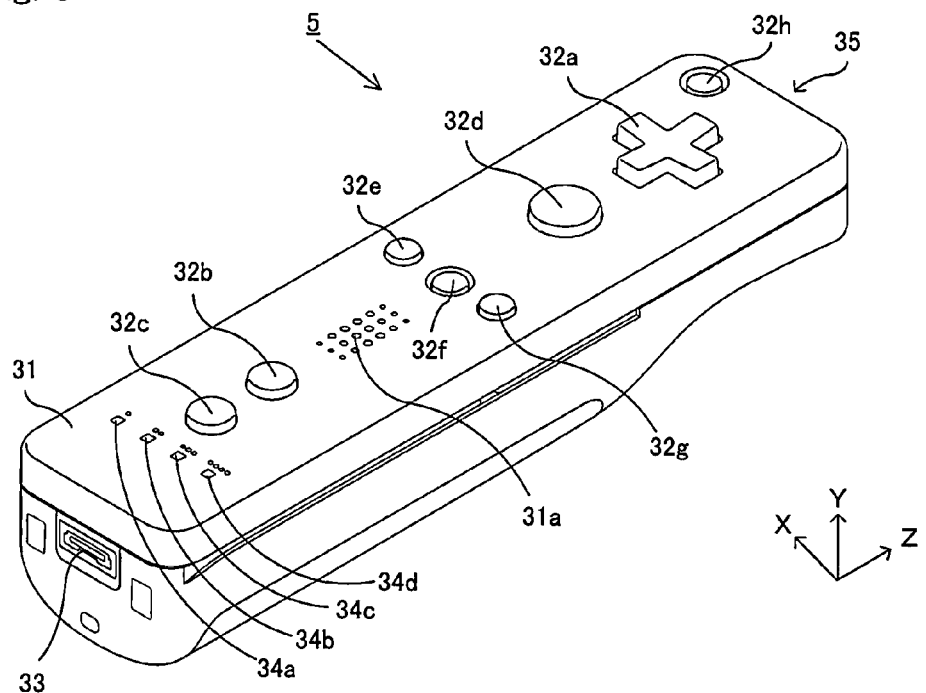
FIG. 3 is a perspective view showing an external configuration of a controller 5.
Figure 4:
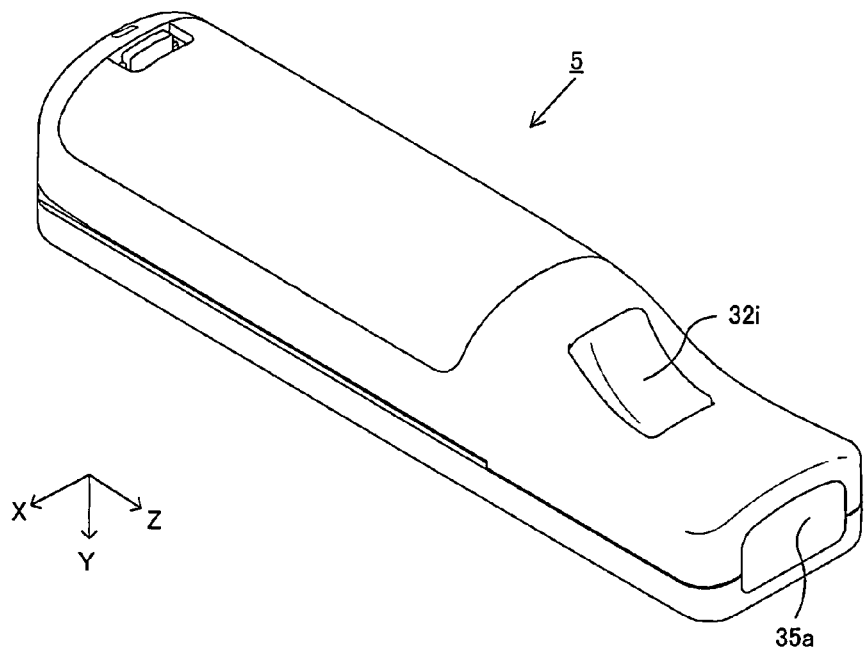
FIG. 4 is a perspective view showing an external configuration of the controller 5.

Next, the controller 5 will be described with reference to FIGS. 3 to 6. FIGS. 3 and 4 are perspective views showing an external appearance or configuration of the controller 5. FIG. 3 is a perspective view of the controller 5 as viewed from the top and the rear. FIG. 4 is a perspective view of the controller 5 as viewed from the bottom and the front.

In FIGS. 3 and 4, the controller 5 has a housing 31 which is formed by, for example, plastic molding. The housing 31 is in the shape of substantially a rectangular parallelepiped where a front-to-rear direction (the Z-axis direction in FIG. 3) is a longitudinal direction. The whole housing 31 has a size which enables an adult and a child to hold the controller 5 with one hand. A player performs a game operation by using the controller 5, i.e., specifically, pressing down a button provided on the controller 5, and moving the controller 5 itself to change a position or an attitude of the controller 5.

The housing 31 is provided with a plurality of operation buttons. As illustrated in FIG. 3, a cross button 32a, a first button 32b, a second button 32c, an A-button 32d, a minus button 32e, a home button 32f, a plus button 32g, and a power button 32h are provided on an upper surface of the housing 31. On the other hand, as illustrated in FIG. 4, a hollow portion is formed on a lower surface of the housing 31. A B-button 32i is provided on a rear slope surface of the hollow portion. These operation buttons 32a to 32i are assigned respective functions depending on a game program executed by the game apparatus 3 as required. The power button 32h is used to remotely power ON/OFF the main body of the game apparatus 3. Upper surfaces of the home button 32f and the power button 32h are buried below the upper surface of the housing 31. Thereby, the player is prevented from unintentionally and erroneously pressing down the home button 32f and the power button 32h.

A connector 33 is provided on a rear surface of the housing 31. The connector 33 is used to connect the controller 5 with other devices (e.g., another controller).

A plurality of LEDs 34a to 34d (four LEDs in FIG. 3) are provided at a rear portion of the upper surface of the housing 31. Here, the controller 5 is assigned controller identification (number) so as to distinguish it from other controllers. The LEDs 34a to 34d are used so as to notify the player of controller identification currently set for the controller 5, the state of charge of a battery in the controller 5, or the like. Specifically, when a game operation is performed using the controller 5, any one of the LEDs 34a to 34d is turned ON, depending on the controller identification.

Figure 5A:
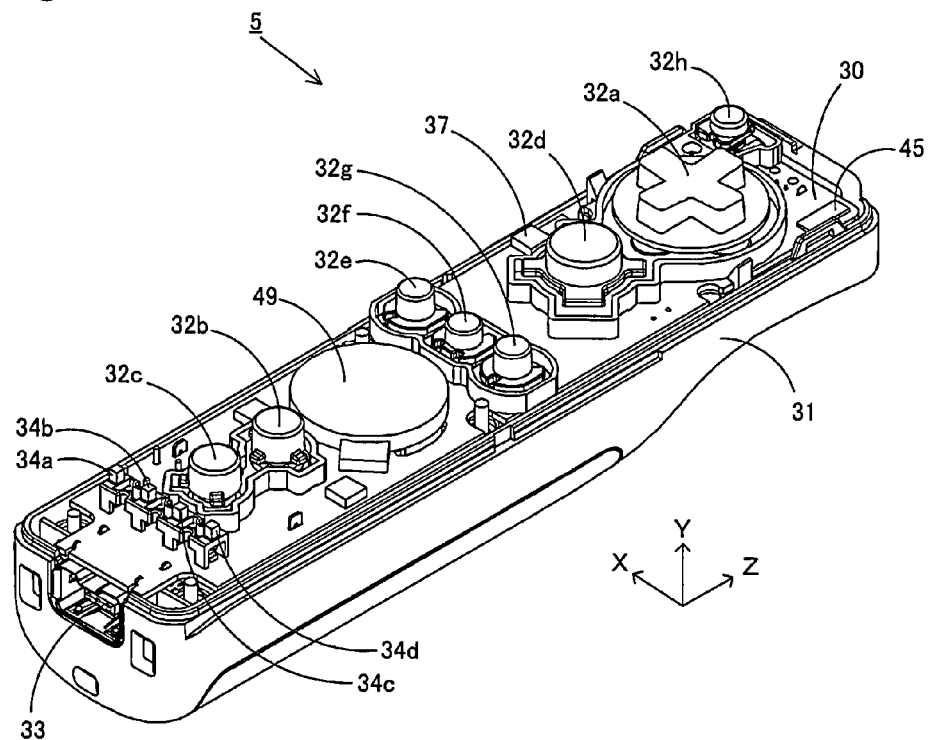
FIG. 5A is a diagram showing an internal structure of the controller 5.
Figure 5B:
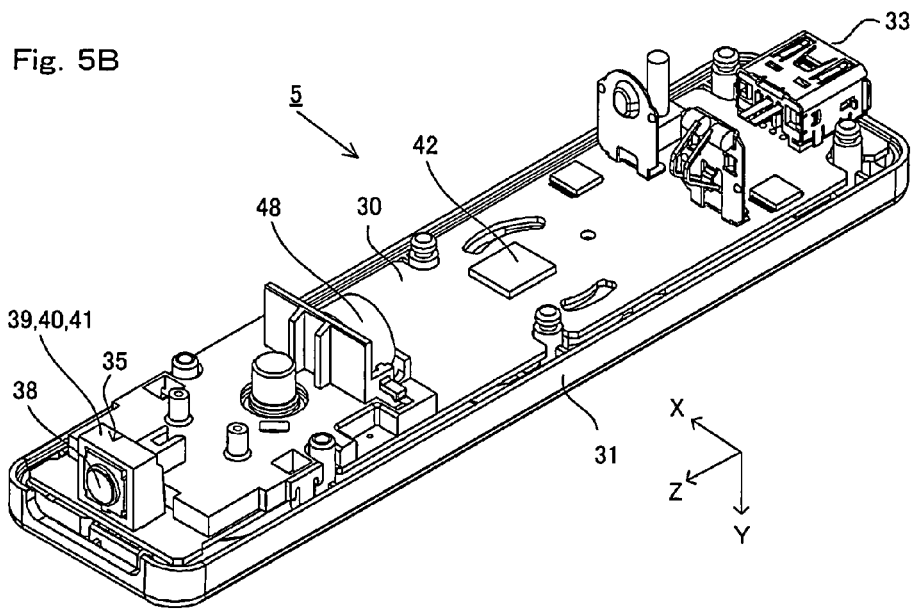
FIG. 5B is a diagram showing an internal structure of the controller 5.

The controller 5 has an image capture information computing section 35 (FIG. 5B). As illustrated in FIG. 4, a light incident surface 35a for the image capture information computing section 35 is provided on a front surface of the housing 31. The light incident surface 35a is made of a material which can transmit at least infrared light from the markers 6R and 6L.

Also, sound holes 31a through which sound is emitted from a loudspeaker 49 (FIG. 5A) included in the controller 5 to the outside, are formed between the first button 32b and the home button 32f on the upper surface of the housing 31.

Next, an internal structure of the controller 5 will be described with reference to FIGS. 5A and 5B. FIGS. 5A and 5B are diagrams showing the internal structure of the controller 5. Note that FIG. 5A is a perspective view of the controller 5 where an upper housing (a portion of the housing 31) is cut away. FIG. 5B is a perspective view of the controller 5 where a lower housing (a portion of the housing 31) is cut away. FIG. 5B illustrates a perspective view of a base board 30 of FIG. 5A as viewed from a bottom surface thereof.

In FIG. 5A, the base board 30 is fixed inside the housing 31. On an upper major surface of the baseboard 30, the operation buttons 32a to 32h, the LEDs 34a to 34d, an acceleration sensor 37, an antenna 45, the loudspeaker 49, and the like are provided. These are connected to a microcomputer 42 (see FIG. 5B) via conductors (not shown) formed on the base board 30 and the like. In this embodiment, the acceleration sensor 37 is positioned away from a center of the controller 5 in the X-axis direction, thereby facilitating calculation of a motion of the controller 5 when the controller 5 is rotated around the Z axis. The acceleration sensor 37 is provided farther forward than the center of the controller 5 with respect to the longitudinal direction (Z-axis direction). A radio module 44 (FIG. 6) and the antenna 45 enable the controller 5 to function as a wireless controller.

On the other hand, in FIG. 5B, the image capture information computing section 35 is provided at a front edge on a lower major surface of the base board 30. The image capture information computing section 35 comprises an infrared filter 38, a lens 39, an image capturing device 40, and an image processing circuit 41, which are arranged in this order from the front of the controller 5. These members 38 to 41 are attached on the lower major surface of the base board 30.

The microcomputer 42 and a vibrator 48 are provided on the lower major surface of the base board 30. The vibrator 48 may be, for example, a vibration motor or a solenoid. The vibrator 48 is connected to the microcomputer 42 via a conductor formed on the baseboard 30 and the like. The activation of the vibrator 48, which is instructed by the microcomputer 42, generates vibration in the controller 5. Thereby, the vibration is transferred to a user's hand holding the controller 5, thereby making it possible to achieve a so-called vibration-feature supporting game. In this embodiment, the vibrator 48 is disposed somehow closer to the front of the housing 31, i.e., the vibrator 48 is placed closer to the end of the controller 5 than the center of the controller 5 is. Therefore, the vibration of the vibrator 48 significantly vibrates the whole controller 5. The connector 33 is attached to a rear edge on the major lower surface of the base board 30. Note that, in addition to the parts of FIGS. 5A and 5B, the controller 5 comprises a quartz oscillator for generating a basic clock for the microcomputer 42, an amplifier for outputting an audio signal to the loudspeaker 49, and the like.

Note that the shape of the controller 5, the shape of each operation button, the numbers and arrangements of acceleration sensors and vibrators, and the like of FIGS. 3 to 5A and 5B and the like are only for illustrative purposes. The embodiments described herein can be implemented using other shapes, numbers and arrangements. Although the image capture direction of the image capture means is assumed to be the positive Z-axis direction in this embodiment, the image capture direction may be any direction. The image capture information computing section 35 (the light incident surface 35a of the image capture information computing section 35) in the controller 5 may not be positioned on the front surface of the housing 31, and may be provided on other surfaces as long as it can capture light from the outside of the housing 31.

Figure 6:
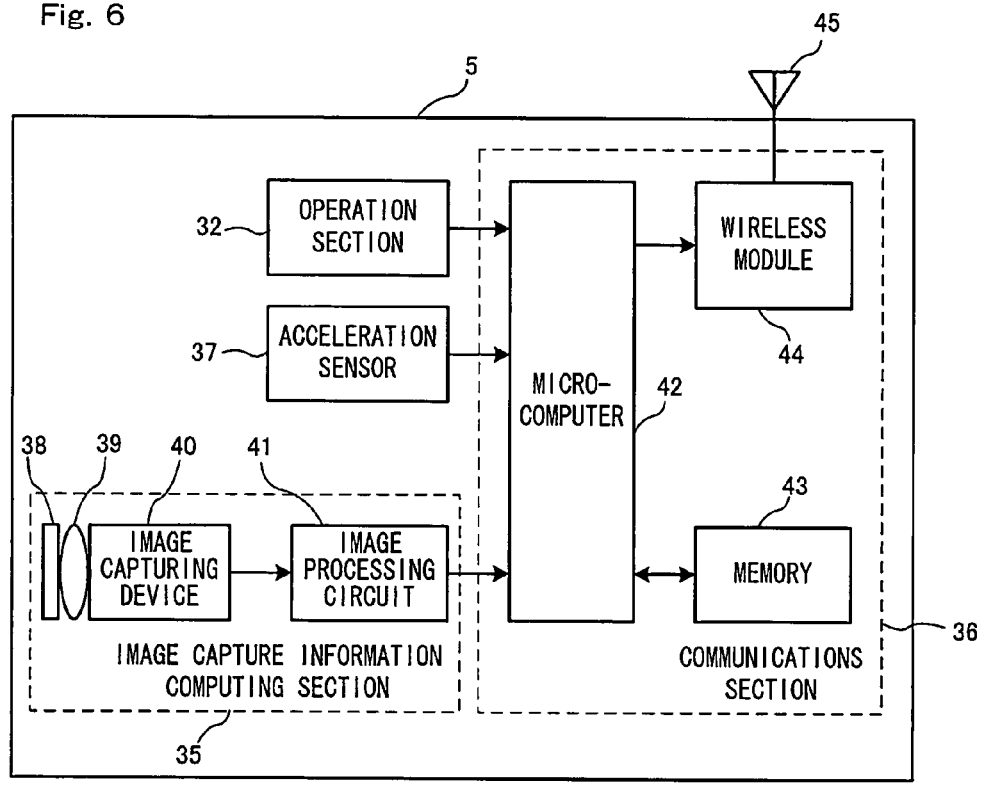
FIG. 6 is a block diagram showing a configuration of the controller 5.

FIG. 6 is a block diagram showing a configuration of the controller 5. The controller 5 comprises an operation section 32 (operation buttons 32a to 32i), the connector 33, the image capture information computing section 35, a communications section 36, and the acceleration sensor 37. The controller 5 transmits data indicating an operation which has been performed with respect to itself, as operation data, to the game apparatus 3.

The operation section 32 includes the operation buttons 32a to 32i, and outputs data indicating an input state of each of the operation buttons 32a to 32i (whether or not each of the operation buttons 32a to 32i has been pressed down) to the microcomputer 42 of the communications section 36.

The image capture information computing section 35 is a system for analyzing image data captured by an image capturing means to determine a region having a high luminance in the image data and detect a center-of-gravity position, a size or the like of the region. The image capture information computing section 35 has, for example, a maximum sampling cycle of about 200 frames/sec, and therefore, can track and analyze a relatively high-speed motion of the controller 5.

The image capture information computing section 35 includes the infrared filter 38, the lens 39, the image capturing device 40, and the image processing circuit 41. The infrared filter 38 passes only infrared light entering from the front of the controller 5. The lens 39 collects infrared light passing through the infrared filter 38 and causes the light to enter the image capturing device 40. The image capturing device 40 may be, for example, a solid-state image capturing device, such as a CMOS sensor or a CCD sensor, receives infrared light collected by the lens 39, and outputs an image signal. Here, the markers 6R and 6L of the marker unit 6 provided in the vicinity of the display screen of the television 2 are each made of an infrared LED which outputs infrared light toward the front of the television 2. Therefore, by providing the infrared filter 38, the image capturing device 40 captures only infrared light passing through the infrared filter 38 to generate image data. Thereby, images of the markers 6R and 6L can be more correctly captured. Hereinafter, the image captured by the image capturing device 40 is referred to as a captured image. The image data generated by the image capturing device 40 is processed by the image processing circuit 41. Specifically, the image processing circuit 41 calculates a position of a target object (the markers 6R and 6L) in the captured image. The image processing circuit 42 outputs coordinates indicating the calculated position to the microcomputer 42 of the communications section 36. The coordinate data is transmitted as operation data by the microcomputer 42 to the game apparatus 3. Hereinafter, the coordinates are referred to as "marker coordinates". The marker coordinates vary, depending on an orientation (attitude) or a position of the controller 5 itself. Therefore, the game apparatus 3 can use the marker coordinates to calculate the orientation or position of the controller 5.

The acceleration sensor 37 detects an acceleration (including a gravity acceleration) of the controller 5, i.e., detects a force (including gravity) applied to the controller 5. Of accelerations applied to a detection portion of the acceleration sensor 37, the acceleration sensor 37 detects a value of an acceleration (linear acceleration) in a linear direction along a sensing-axis direction. For example, in the case of a multi-axis acceleration sensor having two or more axes, an acceleration component along each axis is detected as an acceleration applied to the detection portion of the acceleration sensor. For example, a three- or two-axis acceleration sensor may be available from Analog Devices, Inc. or STMicroelectronics N.V. Although the acceleration sensor 37 is here assumed to be of a capacitance type, other types of acceleration sensors may be used.

In this embodiment, the acceleration sensor 37 detects a linear acceleration along each of three axes extending in a vertical direction (Y-axis direction in FIG. 3), a lateral direction (X-axis direction in FIG. 3), and a front-to-rear direction (Z-axis direction in FIG. 3), where the controller 5 is used as a reference. Since the acceleration sensor 37 detects an acceleration with respect to a linear direction along each axis, an output of the acceleration sensor 37 indicates a value of a linear acceleration along each axis. In other words, the detected acceleration is represented as a three-dimensional vector (AX, AY, AZ) in an XYZ coordinate system provided where the controller 5 is a reference. Hereinafter, a vector having acceleration values with respect to the three axes which are detected by the acceleration sensor 37 is referred to as an acceleration vector.

Data (acceleration data) indicating the acceleration detected by the acceleration sensor 37 is output to the communications section 36. Note that the acceleration detected by the acceleration sensor 37 varies depending on the orientation (attitude) or motion of the controller 5 itself, so that the game apparatus 3 can calculate the orientation or motion of the controller 5 using the acceleration data. In this embodiment, the game apparatus 3 determines the attitude of the controller 5 based on the acceleration data.

It would be easily understood by those skilled in the art from the description of the present specification that additional information about the controller 5 can be estimated or calculated (determined) by a computer, such as a processor (e.g., the CPU 10) of the game apparatus 3, a processor (e.g., the microcomputer 42) of the controller 5, or the like, performing a process based on an acceleration signal output from the acceleration sensor 37. For example, the computer may execute a process, assuming that the controller 5 including the acceleration sensor 37 is in the static state (i.e., the acceleration sensor 37 detects only the acceleration of gravity). In this case, when the controller 5 is actually in the static state, it can be determined whether or not or how much the attitude of the controller 5 is tilted with respect to the direction of gravity based on the detected acceleration. Specifically, with reference to a state in which the detection axis of the acceleration sensor 37 is directed vertically downward, it can be determined whether or not 1 G (acceleration of gravity) is applied to the controller 5. Also, based on the magnitude of the acceleration, it can be determined how much the controller 5 is tilted. If the acceleration sensor 37 is of the multi-axis type, it can be determined in more detail how much the controller 5 is tilted with respect to the direction of gravity, by processing an acceleration signal for each axis. In this case, the processor may calculate a tilt angle of the controller 5 based on an output of the acceleration sensor 37, or may calculate a tilt direction of the controller 5 without calculating the tilt angle. Thus, the tilt or attitude of the controller 5 can be determined using a combination of the acceleration sensor 37 and the processor.

On the other hand, when the controller 5 is assumed to be in the operating state (a state in which the controller 5 is being operated), the acceleration sensor 37 detects an acceleration caused by a motion of the controller 5 in addition to the acceleration of gravity. Therefore, a direction of the motion of the controller 5 can be determined by removing the acceleration-of-gravity component from the detected acceleration by a predetermined process. Even when the controller 5 is assumed to be in a dynamic state, the tilt of the controller 5 with respect to the direction of gravity can be determined by removing an acceleration component caused by a motion of the acceleration sensor 37 from the detected acceleration by a predetermined process. In other examples, the acceleration sensor 37 may comprise a built-in processing apparatus or another type of dedicated apparatus for performing a predetermined process with respect to an acceleration signal detected by a built-in acceleration detecting means before outputting the acceleration signal to the microcomputer 42. The built-in or dedicated processing apparatus, when used to, for example, detect a static acceleration (e.g., the acceleration of gravity) of the acceleration sensor 37, may convert the acceleration signal into a tilt angle (alternatively, another preferable parameter).

The communication section 36 includes the microcomputer 42, a memory 43, the radio module 44, and the antenna 45. The microcomputer 42 controls the radio module 44 which wirelessly transmits data obtained by the microcomputer 42 to the game apparatus 3, while using the memory 43 as a memory area during a process.

Data output from the operation section 32, the image capture information computing section 35, and the acceleration sensor 37 to the microcomputer 42 is temporarily stored in the memory 43. The data is transmitted as the operation data to the game apparatus 3. Specifically, when the timing of transmission to the wireless controller module 19 of the game apparatus 3 arrives, the microcomputer 42 outputs the operation data stored in the memory 43 to the radio module 44. The radio module 44 uses, for example, the Bluetooth® technique to modulate carrier waves having a predetermined frequency with the operation data, and emits a resultant weak radio wave signal from the antenna 45. In other words, the operation data is modulated by the radio module 44 into the weak radio wave signal, which is in turn transmitted from the controller 5. The weak radio wave signal is received by the wireless controller module 19 of the game apparatus 3. By demodulation or decoding of the received weak radio wave signal, the game apparatus 3 can obtain the operation data. The CPU 10 of the game apparatus 3 performs a game process based on the obtained operation data and a game program. Note that wireless transmission from the communication section 36 to the wireless controller module 19 is sequentially executed in predetermined cycles. Since a game process is generally executed in units of ¹⁄₆₀ sec (one frame time), transmission is preferably performed in cycles which are shorter than ¹⁄₆₀ sec. For example, the communication section 36 of the controller 5 outputs the operation data to the wireless controller module 19 of the game apparatus 3 at a rate of one per ¹⁄₂₀₀ sec.

Figure 7:
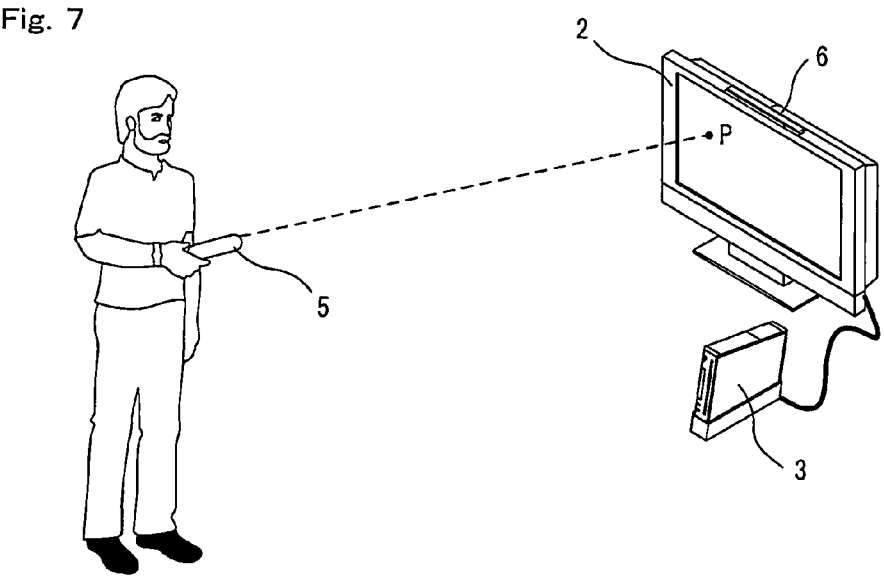
FIG. 7 is a diagram showing a situation where a player uses the controller 5 to perform a game operation.

The player can perform an operation of pointing any position on the screen using the controller 5 in addition to a conventional general game operation of pressing down each operation button. FIG. 7 is a diagram showing a situation where the player uses the controller 5 to perform a game operation. In this embodiment, as illustrated in FIG. 7, the player performs a game operation of moving the controller 5 and a game operation of pointing at a position P on the screen of the television 2 using the controller 5.

(Outline of Process in Game Apparatus 3)

Hereinafter, an outline of a process executed in the game apparatus 3 according to this embodiment will be described.

Hereinafter, an image process of adding a contour to an image of a three-dimensional virtual space will be mainly described. This process is performed so as to, for example, express an object, such as a player character appearing in a game space or the like, in a cartoon-like (comic-like) style.

Figure 8:
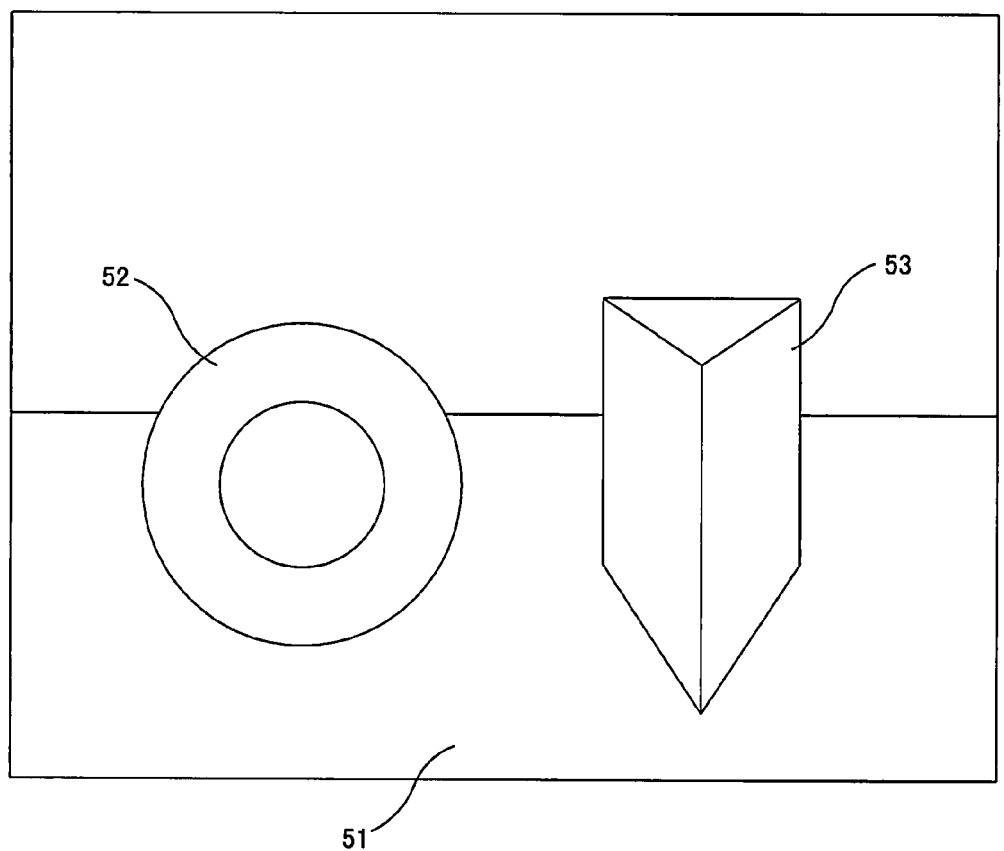
FIG. 8 is a diagram showing an exemplary image of a three-dimensional space.

FIG. 8 is a diagram showing an exemplary image of a three-dimensional space. In FIG. 8, a ground object 51 is provided in a three-dimensional virtual space (game space). A first object 52 and a second object 53 are provided on the ground object 51. The first object 52 is in the shape of a calabash (two spheres are joined together). FIG. 8 shows the first object 52 as viewed from the smaller sphere side. The second object 53 is in the shape of a triangular prism. The three-dimensional space image as shown in FIG. 8 is generated based on a virtual camera provided in the three-dimensional space by a well-known technique. Specifically, the game apparatus 3 generates an image of the three-dimensional space as viewed in a direction (line-of-sight direction) of the virtual camera from a position (viewpoint position) of the virtual camera by, for example, perspective transformation where the position of the virtual camera is used as a reference with respect to the three-dimensional space. Note that, when the three-dimensional space image is generated, a Z value indicating a depth (in the line-of-sight direction from the viewpoint) in the three-dimensional space of an object of interest which is displayed in pixels, is calculated for each pixel. In a contour detecting process described below, the Z value is used to detect a pixel corresponding to a contour (a pixel in which the contour is to be drawn).

Figure 9:
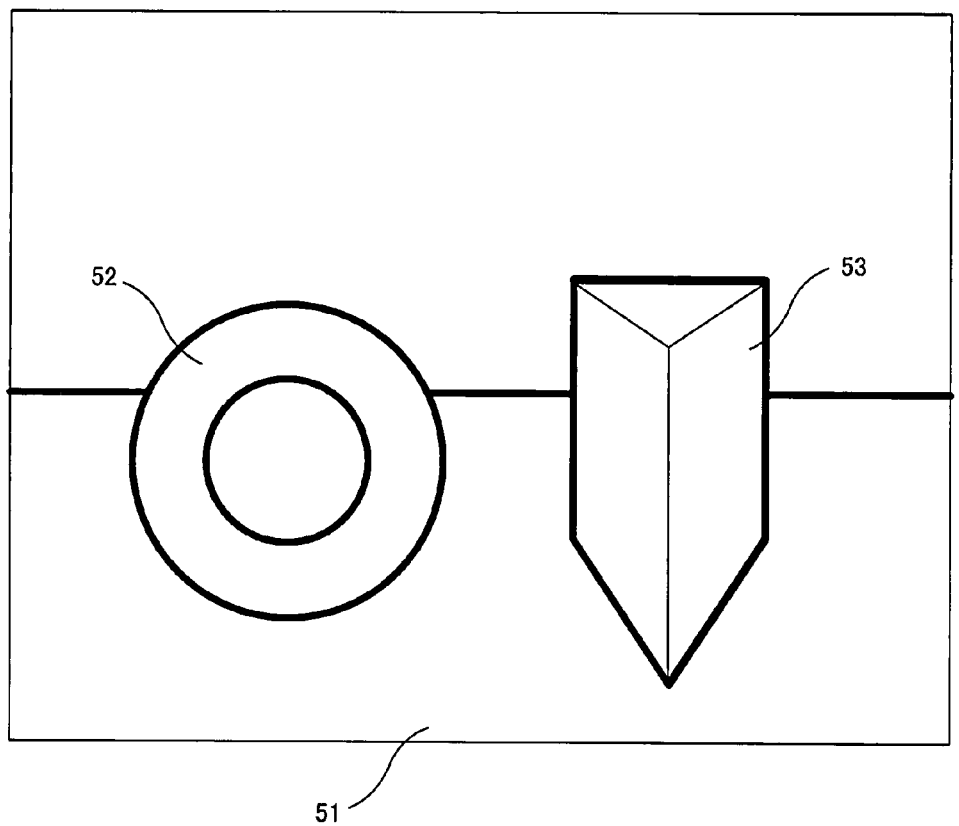
FIG. 9 is a diagram showing an exemplary image obtained by adding contours to the image of FIG. 8.

FIG. 9 is a diagram showing an exemplary image obtained by adding contours to the image of FIG. 8. Note that, in FIG. 9, the contours which are added by a process performed by the game apparatus 3 are indicated by thick lines. Also, in FIGS. 8 and 9, a boundary portion between one object and another object, a sharp portion of an object, and the like are indicated by thin lines for the sake of convenience, though it is different from an actual image. In this embodiment, the game apparatus 3 performs a process of generating an image with a contour (FIG. 9) from the image of FIG. 8. Note that, hereinafter, an image before a contour is added as shown in FIG. 8 is referred to as an original image, while an image obtained by adding a contour to an image as shown in FIG. 9 is referred to as a contour image.

In this embodiment, the game apparatus 3 does not draw a contour by preparing an enlarged three-dimensional model as in the conventional art, and generates a contour image using an original image and a Z value set for each pixel of the original image. Specifically, the game apparatus 3 detects pixels corresponding to a contour of all pixels of the original image using Z values and fills the detected pixels with a contour color (e.g., black) to obtain a contour image. Thereby, it is possible to generate a contour image without preparing a new model, i.e., in a stable processing amount corresponding to the number of pixels which does not vary, since the load of drawing contours does not depend on the number of objects, the amount of data of objects, or the like. Hereinafter, the process of detecting a pixel corresponding to a contour (contour detecting process) will be described.

In the contour detecting process, the game apparatus 3 executes a determination process of determining whether or not each pixel of an original image corresponds to a contour based on a difference in Z value between the pixel and a pixel having a predetermined positional relationship with that pixel, thereby detecting pixels corresponding to the contour. Hereinafter, a pixel to be processed by the above-described determination process is referred to as a "pixel of interest". A pixel having a predetermined positional relationship with a pixel of interest is referred to as a "reference pixel". The reference pixel is a pixel whose Z value is referenced in the above-described determination process. Thus, in this embodiment, it is determined whether or not a pixel of interest corresponds to a contour based on a difference in Z value between the pixel of interest and the reference pixel.

Figure 10:
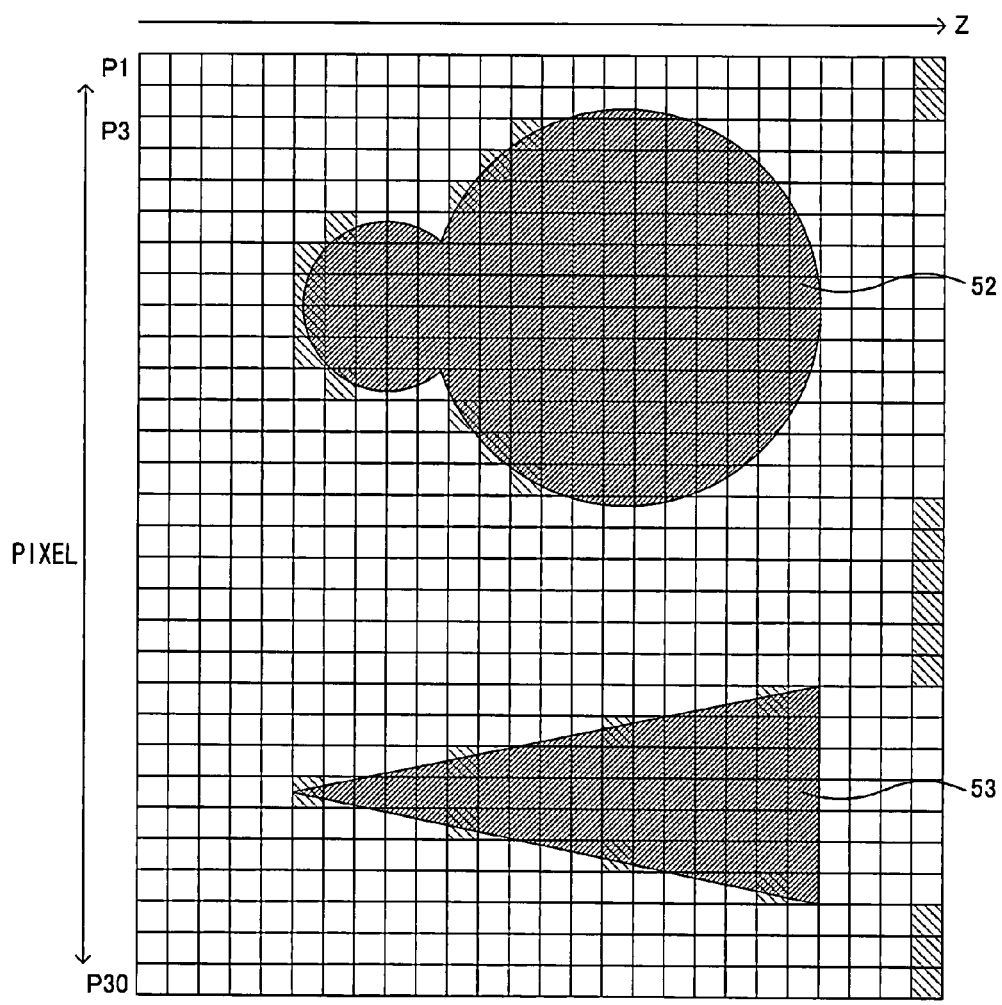
FIG. 10 is a diagram showing a relationship between pixels drawn in an object in a three-dimensional space and Z values set for the pixels.

FIG. 10 is a diagram showing a relationship between pixels drawn in the three-dimensional space object and Z values set for the pixels. FIG. 10 schematically shows a cross-section taken at a predetermined position in the three-dimensional space of the first and second objects 52 and 53 as viewed in a direction perpendicular to the line-of-sight direction of the virtual camera. Specifically, a three-dimensional space corresponding to an array of pixels is shown. In FIG. 10, for the sake of convenience, a grid is provided where grid-sections in the lengthwise direction represent unit pixels while grid-sections in the widthwise direction represent unit Z values. In other words, one lengthwise grid-section represents one pixel, and in FIG. 10, 30 pixels are shown, ranging from a pixel P1 to a pixel P30 successively from the top. The pixels P1 to P30 are pixels arranged on a line in the lengthwise or widthwise direction in the image. One grid-section in the widthwise direction represents a minimum unit of Z values. Also, in FIG. 10, hatched grid-sections indicate portions of the objects 52 and 53 which are drawn in pixels. For example, an edge portion of the first object 52 is drawn in the third pixel P3 as counted from the top, so that the Z value of the pixel P3 has a magnitude corresponding to 13 grid-sections as counted from a reference (the left end in FIG. 10). Note that it is here assumed that each object is not transparent. Background is drawn in pixels in which no object is drawn, so that the Z values of the pixels take a maximum value. Hereinafter, the contour detecting process will be described using diagrams indicating a relationship between pixels and Z values as shown in FIG. 10.

Figure 11:
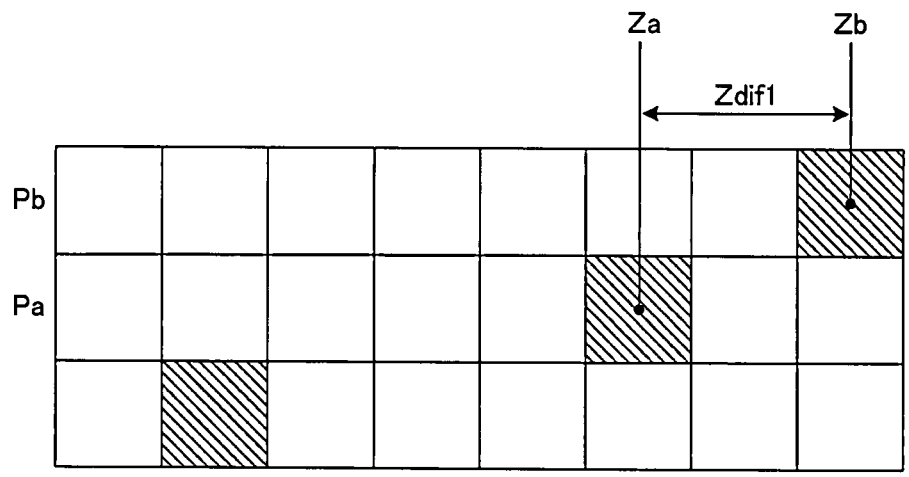
FIG. 11 is a diagram for describing a first method as a contour detecting process.

FIG. 11 is a diagram for describing a first method as the contour detecting process. FIG. 11 is a diagram schematically showing a cross-section taken at a predetermined position in the three-dimensional space as in the diagram of FIG. 10. Note that, in FIG. 11, only an area corresponding to three pixels is shown. In the first method, for a pixel of interest, a pixel (s) adjacent thereto in a predetermined direction is assumed as a reference pixel. Referring to FIG. 11, when a pixel Pa is assumed as a pixel of interest, a pixel Pb adjacent thereto in a predetermined direction (upward in FIG. 11) is a reference pixel. In the first method, the game apparatus 3 calculates a difference (the absolute value of the difference) Zdif1 between a Z value Za of the pixel of interest Pa and a Z value Zb of the reference pixel Pb. When the difference Zdif1 is larger than a predetermined threshold value Zs, it is determined that the pixel of interest Pa corresponds to a contour (the pixel of interest Pa is detected as a contour). Here, when the difference Zdif1 is larger than the threshold value Zs, an object which is drawn in the pixel of interest Pa and an object which is drawn in the reference pixel Pb have depths which are considerably separated from each other, so that the two objects are inferred as not being continuous (different objects). Thus, in the first method, by determining whether or not the difference Zdif1 is larger than the threshold value Zs, it is determined whether or not the pixel of interest Pa is a boundary between discontinuous objects, thereby detecting a contour.

Figure 12:
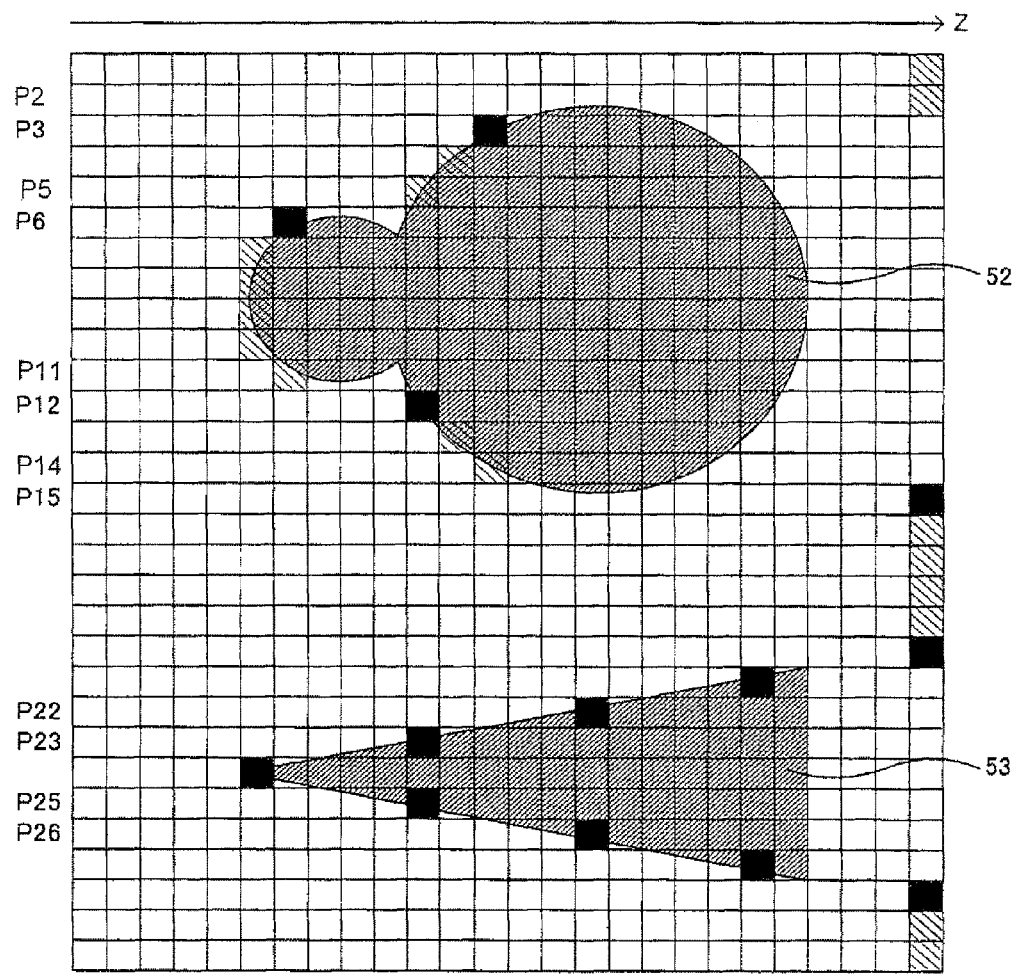
FIG. 12 is a diagram showing a result of detection of a contour by the first method.

FIG. 12 is a diagram showing a result of detection of a contour by the first method. FIG. 12 shows a diagram in which pixels (grid-sections) which have been detected as a contour are filled with black in FIG. 10. Note that, in FIG. 12, the threshold value Zs is assumed to be "3 (grid-sections)". In other words, when the difference in Z value between a pixel of interest and a reference pixel (upper adjacent pixel) in the widthwise direction is larger than three grid-sections, the pixel of interest is determined as a contour.

As shown in FIG. 12, by the first method as the contour detecting process, the pixels P3 and P15 corresponding to an edge of the larger sphere of the first object 52 are detected as a contour, while the pixels P6 and P12 corresponding to an edge of the smaller sphere of the first object 52 are detected as a contour. Thus, for the first object 52, a contour can be detected by the first method as the contour detecting process. Therefore, a contour can be detected in an original image by a simple method (the first method) in which the difference in Z value between two pixels is calculated.

Here, in the first method, for a surface having a small angle with respect of the line-of-sight direction of the virtual camera (a surface nearly parallel with the line-of-sight direction), a contour is likely to fail to be correctly detected. For example, in the example of FIG. 12, the pixels P22, P23, P25 and P26 in which side surfaces of the second object 53 (triangular prism) are drawn is detected as a contour. This is because, for a surface having a small angle with respect to the line-of-sight direction (e.g., the above-described side surface), the difference in Z value between a pixel of interest and a reference pixel is large than the threshold value Zs.

Also, in the first method, there is a slight variation in a detected contour, depending on in what direction a pixel which is used as a reference pixel is located with respect to a pixel of interest. Specifically, in the example of FIG. 12, a pixel above and adjacent to a pixel of interest is assumed as a reference pixel, and therefore, for the first object 52, the pixels P3, P6, P12 and P15 are detected as a contour. However, when a pixel below and adjacent to a pixel of interest is assumed as a reference pixel, the pixels P2, P5, P11 and P14 are detected as a contour of the first object 52. In other words, a pixel which is detected as a contour is shifted by one pixel, depending on in what direction a pixel which is used as a reference pixel is located with respect to a pixel of interest. Also, in the first method, even in the case of a symmetric graphic, such as the first object 52, pixels which are detected as a contour are shifted by one pixel, so that the detected contour is not symmetric. Since typical images have a large number of pixels, such a problem may not become apparent. As described above, however, in the first method, a detected contour is shifted, i.e., it is likely that a contour cannot be correctly detected.

Figure 13:
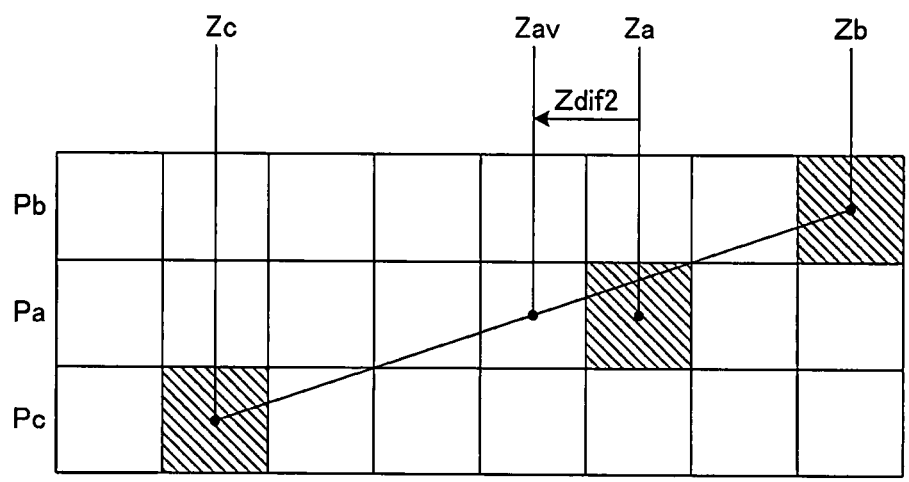
FIG. 13 is a diagram for describing a second method as a contour detecting process.

In the case of the first method, detection is simple. However, in view of the above-described point, a second method is used as the contour detecting process as required. FIG. 13 is a diagram for describing the second method as the contour detecting process. FIG. 13 is a diagram in which a portion of FIG. 10 is enlarged as in FIG. 11. In the second method, pixels on opposite sides of and adjacent to a pixel of interest are assumed as reference pixels. Referring to FIG. 13, when the pixel Pa is a pixel of interest, the pixels Pb and Pc on opposite sides of and adjacent thereto are reference pixels. In the second method, the game apparatus 3 initially calculates an average value Zav of the Z values of the two reference pixels Pb and Pc. Next, a difference Zdif2 is calculated by subtracting the average value Zav from the Z value Za of the pixel of interest Pa. When the difference Zdif2 is larger than a predetermined threshold value Zs (>0), the pixel of interest Pa is determined as corresponding to a contour.

Here, in the second method, the difference Zdif2 is represented by:

$$Zdif2 = Za - (Zb + Zc)/2 \quad (1).$$

Expression (1) can be transformed into:

$$Zdif2 = \{(Za - Zc) - (Zb - Za)\}/2 \quad (2).$$

As can be seen from Expression (2), the difference Zdif2 is ½ of a change amount (difference) between a difference (Zb−Za) which is a difference between the Z value Zb of the reference pixel Pb and the Z value Za of the pixel of interest Pa, and a difference (Za−Zc) which is a difference between the Z value Za of the pixel of interest Pa and the Z value Zc of the reference pixel Pc. Therefore, the difference Zdif2 represents the level of a change (change level) in the difference between the Z value of a pixel of interest and the Z value of a reference pixel. Here, when the change level is larger than a predetermined value, it can be inferred that an object drawn in the pixel of interest Pa and an object drawn in either the reference pixel Pb or Pc adjacent thereto are not continuous (different objects). In the second method, by determining the change level, it is determined whether or not the pixel of interest Pa is a boundary of objects which are not continuous, thereby detecting a contour.

Figure 14:
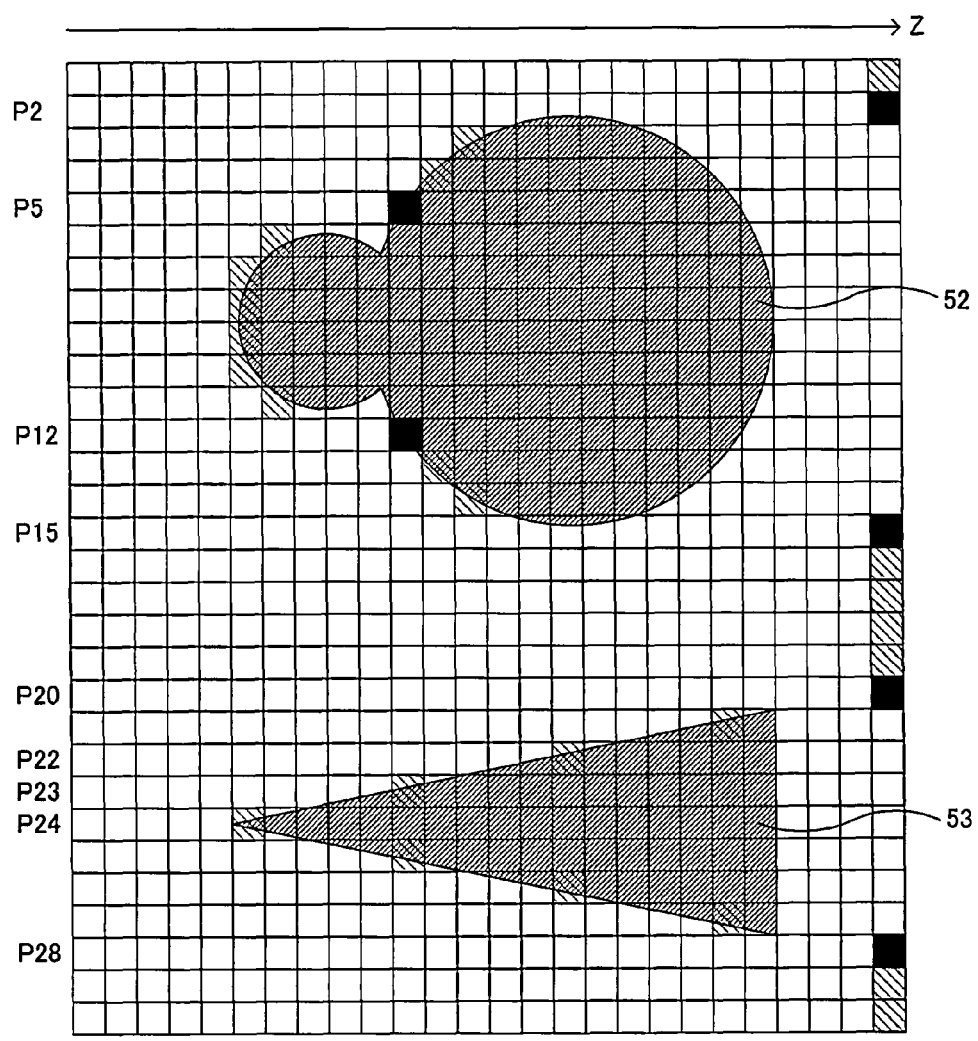
FIG. 14 is a diagram showing a result of detection of a contour by the second method.

FIG. 14 is a diagram showing a result of detection of a contour by the second method. FIG. 14 shows a diagram in which pixels (grid-sections) which have been detected as a contour are filled with black (see P2, P5, P12, P20, and P28) in FIG. 10, as in FIG. 12. According to the second method, the change level of differences in Z value of both adjacent pixels is used. Therefore, for example, the differences Zdif2 of the pixels P22 and P23 are zero. Therefore, as shown in FIG. 14, the pixels P22 and P23 are not detected as a contour. Thus, according to the second method, a surface having a small angle with respect to the line-of-sight direction is not detected as a contour, i.e., a contour can be correctly detected. Also, according to the second method, since pixels on opposite sides of and adjacent to a pixel of interest are used as reference pixels, a detected contour is not shifted, depending on how a reference pixel is set. Therefore, as shown in FIG. 14, for a symmetric graphic, such as the first object 52, a detected contour is also symmetric, i.e., a correct contour can be added.

Note that, in the second method, the difference Zdif2 obtained by subtracting the average value Zav from the Z value Za of a pixel of interest is used as the change level. In this case, only when the Z value Za of a pixel of interest is larger than the average value Zav to some extent, a contour is added. Therefore, as shown in FIG. 14, a contour is added to a portion whose cross-section has a concave shape. Also, in this case, as shown in FIG. 14, a contour is not added to a portion whose cross-section has a convex shape. For example, the pixel P24 corresponding to a side of a side surface of the triangular prism is not detected as a contour. In this case, an image as shown in FIG. 9 is generated as a contour image.

Figure 15:
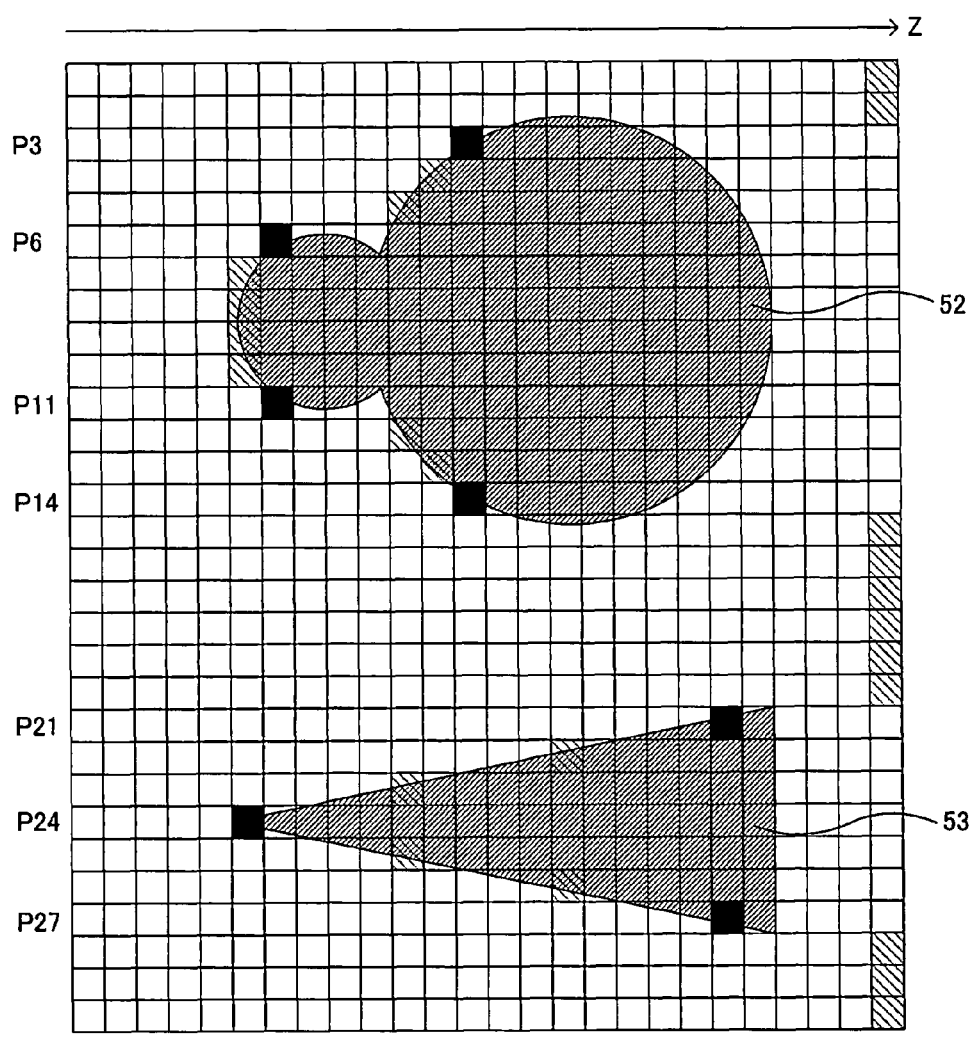
FIG. 15 is a diagram showing a result of detection of a contour when a difference Zdif2' is used as a change level.
Figure 16:
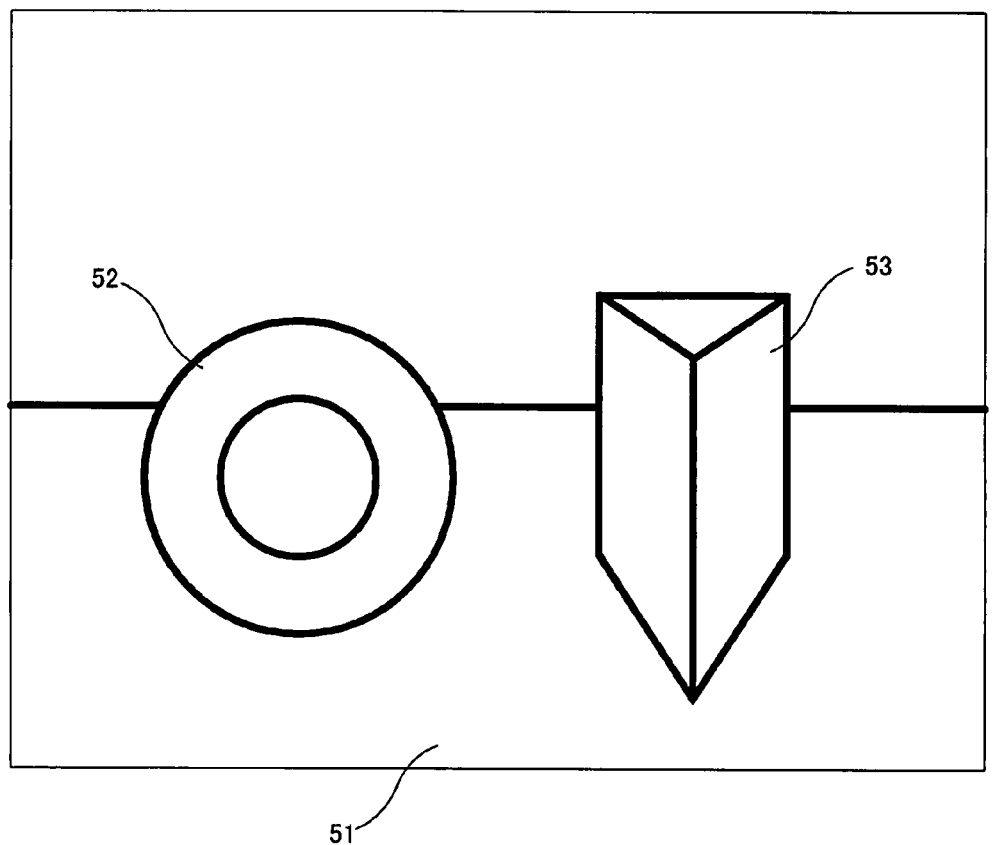
FIG. 16 is a diagram showing an exemplary contour image which is obtained in the case of FIG. 15.

In this embodiment, when a contour is added to a portion whose cross-section has a convex shape, a difference Zdif2' (=−Zdif2) obtained by subtracting the Z value Za of a pixel of interest from the average value Zav may be used as the change level. FIG. 15 is a diagram showing a result of detection of a contour when the difference Zdif2' is used as the change level. In this case, as shown in FIG. 15, when the Z value Za of a pixel of interest is larger than the average value Zav to some extent, a contour is added. Therefore, a contour is added to a portion whose cross-section has a convex shape. FIG. 16 is a diagram showing an exemplary contour image which is obtained in the case of FIG. 15. As shown in FIG. 16, by using the difference Zdif2' as the change level, a contour can be added to a portion (a side of the triangular prism) of the second object 53 whose cross-section has a convex shape. Note that, as can be seen by comparing FIGS. 14 and 15, pixels detected as a contour (e.g., P3, P6, P11, P14, P21, P24 and P27) are shifted by one pixel between when the difference Zdif2 is used and when the difference Zdif2' is used. For example, for the first object 52, when the difference Zdif2 is used (FIG. 14), the pixels P2, P5, P12 and P15 are detected. When the difference Zdif2' is used (FIG. 15), the pixels P3, P6, P11 and P14 are detected. Note that, in either case, a large distortion does not occur in the shape of a contour (e.g., a symmetric contour is added to a symmetric object), so that a significant problem does not arise. Note that a similar result is obtained by performing determination under a condition that Zdif2 is smaller than a predetermined threshold value Zs (<0), instead of the use of Zdif2' as the change level.

In this embodiment, alternatively, the absolute value of the difference Zdif2 (or the difference Zdif2') may be used as the change level. In this case, both when the Z value Za of a pixel of interest is larger than the average value Zav and when the average value Zav is larger than the Z value Za of the pixel of interest, a contour is added. Therefore, a contour can be added to both a portion whose cross-section has a convex shape and a portion whose cross-section has a concave shape. Thus, according to the second method, a portion to which a contour is desired to be added can be easily changed by changing a difference which is used as the change level.

In another embodiment, a ratio of the average value Zav to the Z value Za of a pixel of interest may be used as the change level instead of the difference Zdif2. For example, if a value of "Za/Zav" (or Zav/Za) is larger (or smaller) than or equal to a predetermined threshold value, the pixel of interest may be determined as a contour.

Note that it has been assumed in the above-described first and second methods that a reference pixel adjacent to a pixel of interest either in the lengthwise direction or the widthwise direction of an original image is specified for execution of the contour detecting process. Here, in this embodiment, the game apparatus 3 performs the contour detecting process both in the lengthwise direction and in the widthwise direction. A similar contour detecting process is performed both in the case of the lengthwise direction and in the case of the widthwise direction, except that a pixel adjacent to a pixel of interest in the lengthwise direction is used as a reference pixel or a pixel adjacent to a pixel of interest in the widthwise direction is used as a reference pixel. The game apparatus 3 performs the contour detecting process both in the lengthwise direction and in the widthwise direction, and thereafter, based on the detection results, finally determines whether or not a pixel of interest is a pixel corresponding to a contour, though details thereof will be described below.

(Details of Process in Game Apparatus)

Figure 17:
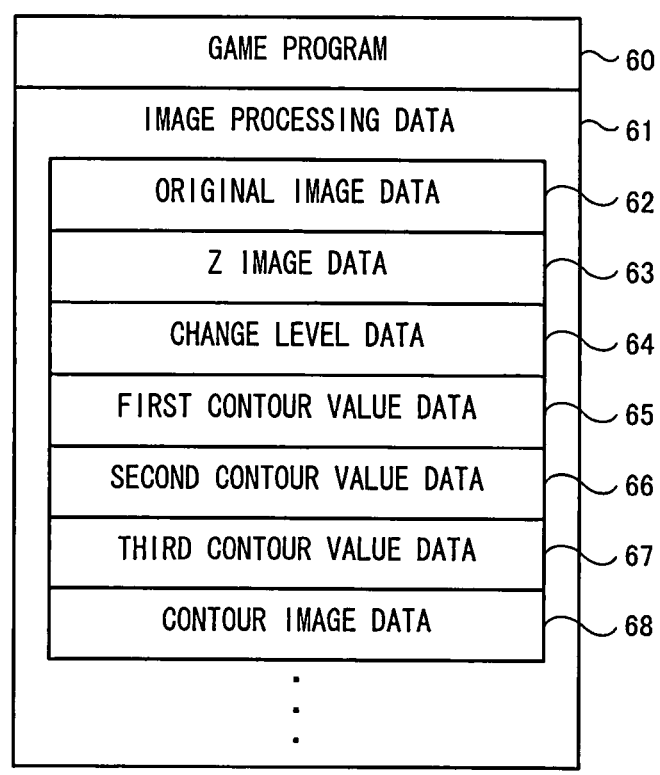
FIG. 17 is a diagram showing main data stored in a main memory of the game apparatus 3.

Hereinafter, an image generating process according to this embodiment will be described in detail with reference to FIGS. 17 to 22. Note that, in the following description, the second method of the first and second methods is used to calculate the change level. FIG. 17 is a diagram showing main data stored in a main memory (the external main memory 12 or the internal main memory 11e) of the game apparatus 3. As shown in FIG. 17, the main memory stores a game program 60, an image processing data 61, and the like. Note that the main memory stores, in addition to the data of FIG. 17, data required for a game process, such as operation data transmitted from the controller 5, image data of various objects appearing in a game, data of various parameters of the objects, and the like.

The game program 60 is an exemplary image processing program according to this embodiment. After the game apparatus 3 is powered ON, the whole or a part of the game program 60 is read from the optical disc 4 into the main memory with appropriate timing. The game program 60 includes a program which causes the CPU 10 to execute an image generating process shown in FIG. 18, and a program which causes the CPU 10 to execute a predetermined game process.

Figure 18:
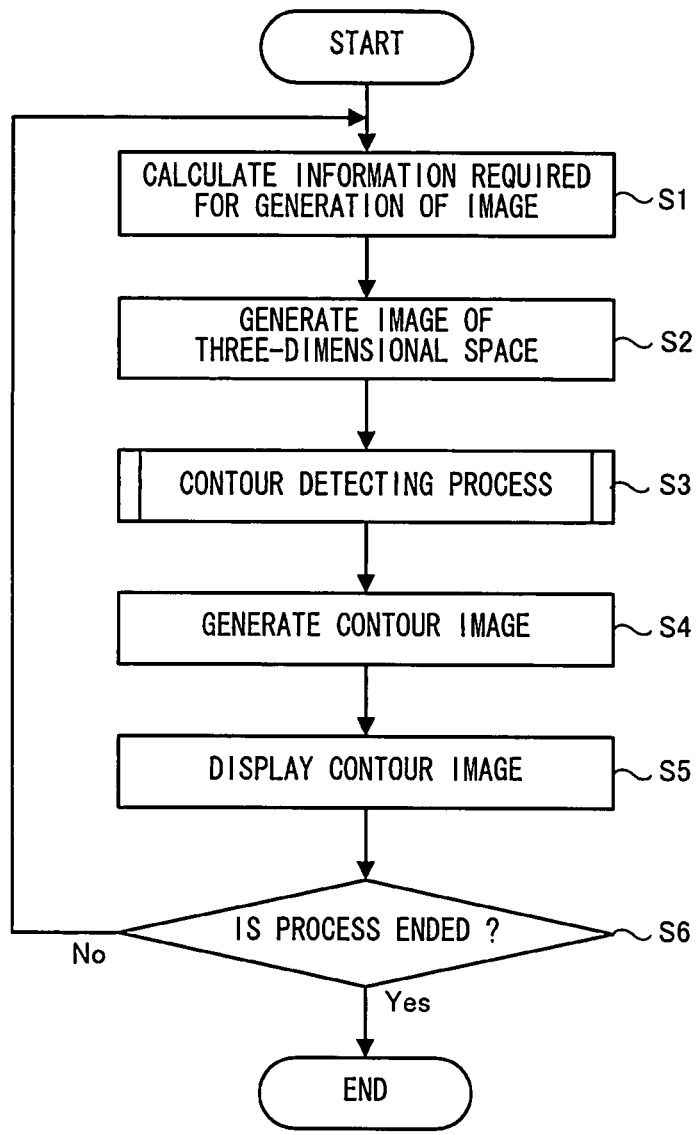
FIG. 18 is a main flowchart showing a flow of an image generating process executed in the game apparatus 3.

The image processing data 61 is data which is used in the image generating process described below (FIG. 18). The image processing data 61 includes original image data 62, Z value data 63, change level data 64, first contour value data 65, second contour value data 66, third contour value data 67, and contour image data 68.

The original image data 62 is data which is of the original image and of a two-dimensional image for representing a three-dimensional space. As described above, the original image data 62 indicates an image before a contour is added. The Z value data 63 is data which indicates a Z value which is calculated for each pixel of the original image when the original image is generated. The Z value data 63 is stored in a memory area which is commonly called a Z buffer.

The change level data 64 is data which indicates the change level which is calculated for a pixel of interest. Hereinafter, the above-described difference Zdif2 obtained by subtracting the average value Zav from the Z value Za of the pixel of interest is used as the change level (see FIG. 13). Note that the change level data 64 indicates the value of a change level of each pixel selected as a pixel of interest. In this embodiment, all pixels in the original image are subjected to the contour detecting process, and therefore, the change level data 64 indicates the value of a change level set for each pixel of the original image.

Each of the contour value data 65 to 67 indicates a contour value set for each pixel of the original image. A contour value represents the shade of color of a contour drawn in a pixel. In this embodiment, a contour value e is represented within the range of $0 \le e \le 1$, and the larger the contour value, the larger the shade of color of a contour. Therefore, in this embodiment, the shade of color of a contour is not uniform, and can be changed from pixel to pixel when the contour is drawn. For a pixel which is determined not to correspond to a contour (a pixel which is not detected as a contour), the contour value is set to be "0".

The first contour value data 65 indicates a first contour value, the second contour value data 66 indicates a second contour value, and the third contour value data 67 indicates a third contour value. Thus, in this embodiment, three contour values, i.e., the first to third contour values, are used. The first contour value indicates a contour value of each pixel which is obtained as a result from execution of the contour detecting process with respect to the widthwise direction of an image. The second contour value indicates a contour value of each pixel which is obtained as a result from execution of the contour detecting process with respect to the lengthwise direction of an image. The third contour value is calculated based on the first and second contour values and indicates the shade of color of each pixel in a contour image which is finally obtained.

The contour image data 68 is data of the contour image. The contour image data 68 is generated using the original image data 62 and the third contour value data 67, though details thereof will be described below.

Next, the image generating process performed in the game apparatus 3 will be described in detail with reference to FIGS. 18 to 20. FIG. 18 is a main flowchart showing a flow of the image generating process executed in the game apparatus 3. When the game apparatus 3 is powered ON and the optical disc 4 storing a game program is loaded into the game apparatus 3, the CPU 10 of the game apparatus 3 executes a boot program stored in a boot ROM (not shown), thereby initializing each unit, such as the main memory or the like. Thereafter, a game program stored in the optical disc 4 is read into the main memory, and the game program is started to be executed by the CPU 10. The flowchart of FIG. 18 shows a process after the above-described process is completed. Note that the process of FIG. 18 is performed by interaction of the CPU 10 and the GPU 11b.

In step S1 shown in FIG. 18, initially, the CPU 10 calculates information required to generate an image of a three-dimensional space. Specifically, a position of each object provided in a virtual three-dimensional space is calculated, or a position and an orientation of a virtual camera are calculated. In this embodiment, for example, a player character is moved in accordance with an operation which has been performed with respect to the controller 5, or the position and orientation of the virtual camera are calculated based on the position of the player character. Note that, in this embodiment, a process loop of steps S1 to S6 is executed in time intervals in which an image displayed on the television 2 is updated, i.e., at a rate of once per frame time (e.g., 1/60 sec).

In the following step S2, the CPU 10 generates an image (original image) in a three-dimensional space. Specifically, for example, by performing perspective transformation based on the virtual camera provided in step S1, an image of a three-dimensional space as viewed from the position (viewpoint position) of the virtual camera in a direction (line-of-sight direction) of the virtual camera is generated. Note that, in the process of generating the original image, a Z value which is calculated for each pixel of the original image is stored into a Z buffer area of the main memory.

In the following step S3, the CPU 10 executes a contour detecting process. The contour detecting process is a process of detecting a pixel corresponding to a contour of all pixels of the original image. Hereinafter, the contour detecting process will be described in detail with reference to FIG. 19.

Figure 19:
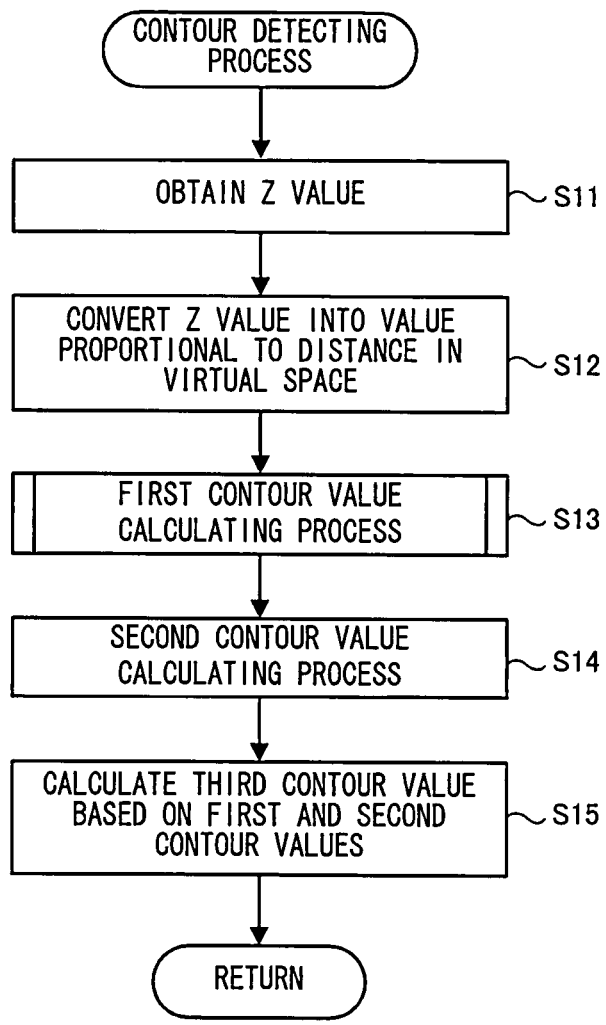
FIG. 19 is a flowchart showing a flow of a contour detecting process (step S3) of FIG. 18.

FIG. 19 is a flowchart showing a flow of the contour detecting process (step S3) of FIG. 18. In the contour detecting process, initially, in step S11, the CPU 10 obtains a Z value set for each pixel of the three-dimensional space image from the Z buffer. Note that a W buffer may be used in order to improve the drawing precision or the like. In this case, in step S11, a value may be obtained from a W buffer instead of Z values. Alternatively, any other value indicating a depth can be used as appropriate.

In the following step S12, the CPU 10 converts each Z value obtained in step S11 into a value which is proportional to a distance in the three-dimensional space. Here, the magnitude of a Z value as it is obtained from the Z buffer may not be proportional to a distance in the three-dimensional space. Specifically, in a general Z buffer, the precision of a Z value is increased toward the screen surface (at a smaller depth) and is decreased farther away from the screen surface (at a larger depth). Therefore, the actual length becomes shorter toward the screen surface (at a smaller depth) even if the length in the depth direction represented by the z value is the same. This is because a higher level of precision is generally required for data toward the screen surface (at a smaller depth). In this embodiment, in order to obtain depth information indicating distances in the three-dimensional space with higher accuracy, Z values are converted into values which are proportional to distances in the three-dimensional space. Specifically, the CPU 10 performs inverse projective transformation with respect to an obtained Z value. Data indicating each Z value after the transformation is stored as the Z value data 63 into the main memory. Note that the Z buffer may be overwritten with the Z value data 63. Alternatively, when data in the Z buffer is desired to be held (e.g., data in the Z buffer is required in another process), the Z value data 63 may be stored into a memory area in addition to the Z buffer. Note that, since Z values as they are in the Z buffer hold a positional relationship in the depth direction, the Z values in the Z buffer as it is can be used so as to reduce the process load.

Although a Z value stored in the Z buffer is transformed in step S12 in this embodiment, the transformation may not be executed in another embodiment. Specifically, in another embodiment, a Z value as it is stored in the Z buffer may be used in the contour detecting process in step S13 and later.

In step S13, the CPU 10 executes a first contour value calculating process. The first contour value calculating process is a process of calculating a first contour value. Specifically, a contour detecting process is performed with respect to the widthwise direction of an image. Hereinafter, the contour detecting process will be described in detail with reference to FIG. 20.

Figure 20:
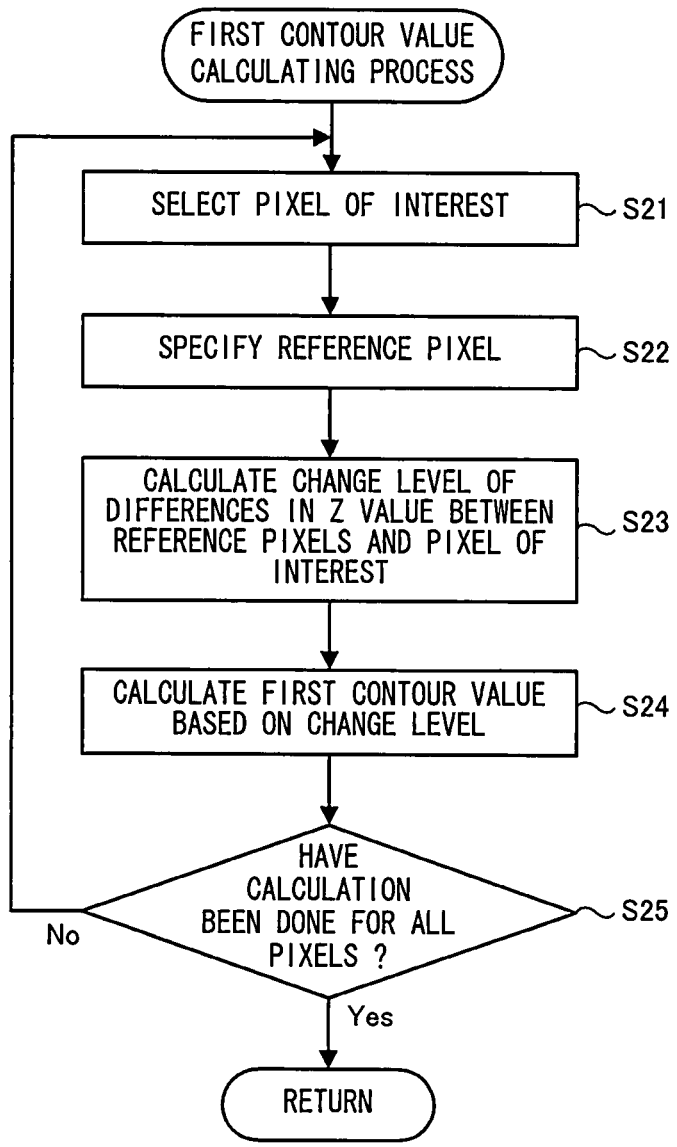
FIG. 20 is a flowchart showing a flow of a first contour value calculating process (step S13) of FIG. 19.

FIG. 20 is a flowchart showing a flow of the first contour value calculating process (step S13) of FIG. 19. In the first contour value calculating process, initially, in step S21, the CPU 10 selects a pixel of interest from all pixels of the original image. In this embodiment, of all pixels of the original image, a pixel which has not been selected in the current first contour value calculating process is selected as a pixel of interest. For example, all the pixels may be sequentially selected from the upper left corner or may be selected in other manners.

Figure 21:
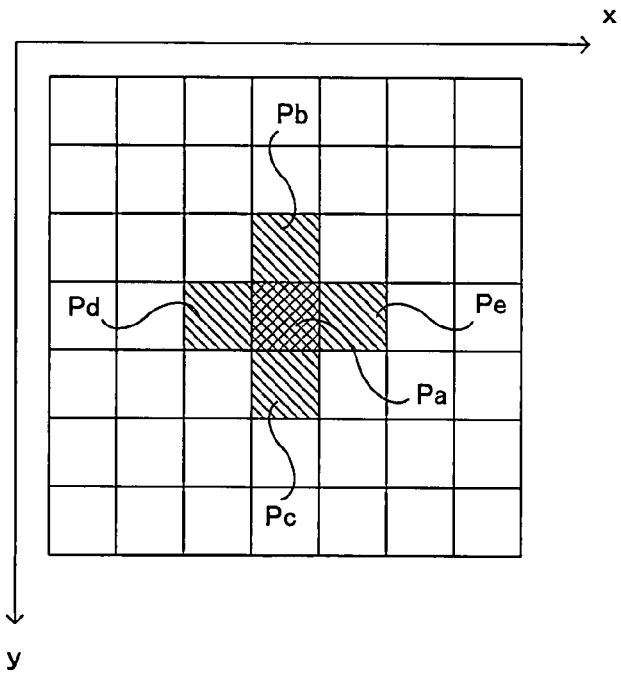
FIG. 21 is a diagram showing a relationship between a pixel of interest and reference pixels in an image.

In step S22, the CPU 10 specifies a reference pixel which has a predetermined positional relationship with respect to the pixel of interest selected in step S21. FIG. 21 is a diagram showing a relationship between a pixel of interest and reference pixels in an image. In this exemplary process, the above-described second method is used. Specifically, pixels on opposite sides of and adjacent to a pixel of interest are specified as reference pixels. In the first contour value calculating process, as shown in FIG. 21, pixels on opposite sides of and adjacent to a pixel of interest Pa in the widthwise direction (x direction), i.e., a pixel Pd to the left of and adjacent to the pixel of interest Pa and a pixel Pe to the right of and adjacent to the pixel of interest Pa, are specified as reference pixels. Also, in a second contour value calculating process (step S14) described below, pixels on opposite sides of and adjacent to the pixel of interest Pa in the lengthwise direction (y direction), i.e., a pixel Pb above and adjacent to the pixel of interest Pa and a pixel Pc below and adjacent to the pixel of interest Pa, are specified as reference pixels.

Note that, in step S22, when a pixel of interest is at an end of an image, there is not an adjacent pixel, and therefore, one of the two reference pixels is not specified. In this case, the CPU 10 executes a process in step S23 (described below) using the Z value of the pixel of interest instead of the Z value of the reference pixel which is not specified. Specifically, when a pixel of interest is at an edge of an image, the change level is calculated, assuming that a pixel having the same Z value as that of the pixel of interest is present adjacent to the pixel of interest. Note that, in another embodiment, in step S21, a pixel at an end of an image may not be selected as a pixel of interest.

Referring back to FIG. 20, in step S23, the CPU 10 calculates a change level of differences in Z value for a pixel of interest. The change level is calculated using the Z value of the pixel of interest and the Z value of each reference pixel indicated by the Z value data 63 stored in the main memory. Specifically, the CPU 10 calculates a change level (a difference obtained by subtracting the average value of the Z values of the two reference pixels from the Z value of the pixel of interest) Zdif2 by substituting the Z value of the pixel of interest and the Z values of the reference pixels into Expression (1). Data indicating the calculated change level is stored as the change level data 64 into the main memory.

Although it has been assumed in step S23 that the second method is used to calculate a change level, the CPU 10 may calculate a change level using the above-described first method. Note that, when the first method is used, only a single pixel may be specified in step S22. Also, in step S23, the CPU 10 calculates a difference in Z value between a pixel of interest and a reference pixel as a change level.

Figure 22:
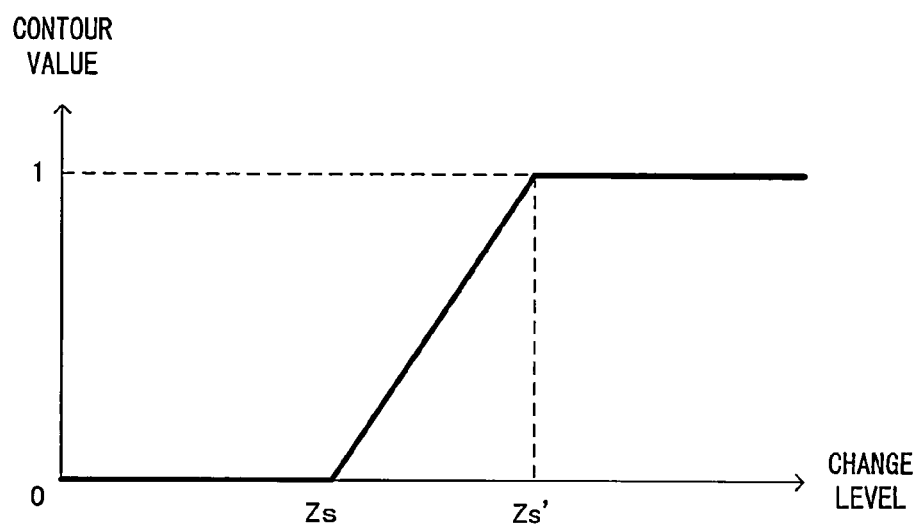
FIG. 22 is a diagram showing a relationship between change levels and contour values.

In step S24, the CPU 10 calculates a first contour value based on the change level calculated in step S23. FIG. 22 is a diagram showing a relationship between change levels and contour values. In this embodiment, the first contour value is calculated from the change level in accordance with the relationship of FIG. 22. As shown in FIG. 22, when the change level Zdif2 is smaller than or equal to the predetermined threshold value Zs, the first contour value e1 is calculated as "0". In other words, when the change level Zdif2 is smaller than or equal to the predetermined threshold value Zs, the pixel of interest is not detected as a contour. On the other hand, when the change level Zdif2 is larger than the predetermined threshold value Zs, the pixel of interest is detected as a contour and the first contour value e1 is calculated as a value which is larger than 0. Here, in this embodiment, when the change level Zdif2 is within the range of Zs<Zdif2<Zs', the first contour value e1 is calculated as a larger value with an increase in the change level Zdif2. When the change level Zdif2 is larger than or equal to a predetermined value Zs', the first contour value e1 is calculated to be a maximum value (=1). Data indicating the first contour value e1 calculated in step S24 is stored as the first contour value data 65 into the main memory.

Although it has been assumed in this embodiment that the first contour value is calculated from the change level in accordance with the relationship of FIG. 22, the contour value may be represented by a binary value "0" or "1" in another embodiment. Specifically, in such an embodiment, when the change level Zdif2 is smaller than or equal to the predetermined threshold value Zs, the first contour value e1 may be calculated as "0", and when the change level Zdif2 is larger than the threshold value Zs, the first contour value e1 may be calculated as "1".

Referring back to FIG. 20, in step S25, the CPU 10 determines whether or not first contour values have been calculated for all pixels of the original image. When the result of determination in step S25 is negative, the process of step S21 is executed again. Thereafter, the processes of steps S21 to S25 are repeatedly executed until it is determined in step S25 that first contour values have been calculated for all the pixels. On the other hand, when the result of determination in step S25 is positive, the CPU 10 ends the first contour value calculating process of FIG. 20.

Referring back to FIG. 19, in step S14 following step S13, the CPU 10 executes the second contour value calculating process. The second contour value calculating process is a process of calculating a second contour value. Specifically, a contour detecting process is performed with respect to the lengthwise direction of an image. The second contour value calculating process is the same as the first contour value calculating process, except that different reference pixels are specified in step S22. In the second contour value calculating process, as shown in FIG. 21, pixels on opposite sides of and adjacent to the pixel of interest Pa in the lengthwise direction, i.e., the pixel Pb above and adjacent to the pixel of interest Pa and the pixel Pc below and adjacent to the pixel of interest Pa, are specified as reference pixels. As a result of step S14, a second contour value is calculated for each pixel of the original image. Data indicating the calculated second contour values is stored as the second contour value data 66 into the main memory.

In step S15, the CPU 10 calculates a third contour value based on the first and second contour values calculated in steps S12 and S13. Here, a third contour value e3 which is set for a certain pixel is calculated by adding the first contour value e1 and the second contour value e2 which are set for the certain pixel. In other words, the CPU 10 adds the first contour value e1 and the second contour value e2 of each pixel to obtain the third contour value e3 of the pixel. Here, the third contour value e3 obtained by the addition is within the range of 0 to 2, and therefore, is normalized into the range of 0 to 1 for the purpose of a process described below. Data indicating the calculated third contour values e3 is stored as the third contour value data 67 into the main memory. After step S15, the CPU 10 ends the contour detecting process. Note that the third contour value e3 may be calculated immediately after the second contour value e2 is calculated for each pixel of interest in the second contour value calculating process. Alternatively, the process of calculating the first contour value e1 and the second contour value e2 and then calculating the third contour value e3 for one pixel of interest may be repeatedly performed for all pixels of interest.

Although it has been assumed in this embodiment that the third contour value e3 is the sum of the first contour value e1 and the second contour value e2, the third contour value e3 may be calculated in other manners as long as the first contour value e1 and the second contour value e2 are used in the calculation. For example, in another embodiment, the third contour value e3 set for a certain pixel may be calculated as the larger one of the first contour value e1 and the second contour value e2 set for the certain pixel. Alternatively, the third contour value e3 may be the product of the first contour value e1 and the second contour value e2.

Note that, in the first contour value calculating process (step S13) in which a contour value is calculated with respect to the widthwise direction (a reference pixel present in the widthwise direction of a pixel of interest is specified), a contour extending in parallel with the lengthwise direction cannot be detected. Also, in the second contour value calculating process (step S14) in which a contour value is calculated with respect to the lengthwise direction (a reference pixel present in the lengthwise direction of a pixel of interest is specified), a contour extending in parallel with the widthwise direction cannot be detected. In other words, if only one of the first contour value calculating process and the second contour value calculating process is performed, a contour extending in a specific direction cannot be detected. Therefore, in this embodiment, the game apparatus 3 executes both the first contour value calculating process and the second contour value calculating process. Based on the results of the first contour value calculating process and the second contour value calculating process (the first contour value and the second contour value), a final contour value (third contour value) of a pixel of interest is calculated. Thereby, a contour extending any direction can be detected, i.e., any contour can be correctly detected.

The first contour value and the second contour value calculated in the first contour value calculating process and the second contour value calculating process are used so as to calculate the third contour value which is a final contour value of a pixel of interest. The contour value indicates whether or not a pixel of interest corresponds to a contour, depending on whether or not the value is "0". Thus, the first contour value calculating process and the second contour value calculating process are considered as processes of preliminarily determining whether or not a pixel of interest corresponds to a contour. The process of step S15 is a process of calculating the third contour value which finally indicates whether or not a pixel of interest corresponds to a contour, based on the first and second contour values. In other words, the process of step S15 is a process of determining whether or not a pixel of interest corresponds to a contour, based on the results of preliminary determination in steps S13 and S14. Thus, in this embodiment, after the preliminary determination processes in the lengthwise direction and widthwise direction of an image, it is finally determined whether or not a pixel of interest corresponds to a contour, thereby making it possible to obtain a final determination result in view of both the lengthwise direction and the widthwise direction.

Referring back to FIG. 18, in step S4 following step S3, the CPU 10 generates a contour image in which a contour is added to an original image. The contour image is calculated based on the original image and the third contour value. Specifically, a color value C3 of a certain pixel in the contour image is calculated using a color value C1 of the pixel in the original image and the third contour value e3 set for the pixel in accordance with:

$$C3 = C1 \times (1 - e3) + C2 \times e3 \tag{3}$$

In Expression (3), a constant C2 is a color value indicating the color of a contour which is previously determined. By performing the calculation of Expression (3) for each pixel, the color value of the pixel in the contour image can be calculated. According to Expression (3), for a pixel which is not detected as a contour (i.e., a pixel having the third contour value e3=0), the color value C1 of the original image directly becomes the color value C3 of the contour image. On the other hand, for a pixel which is detected as a contour, the larger the third contour value e3, the lower the proportion of the color of the original image, i.e., the higher the proportion of the color of the contour. In other words, the color value C3 of the contour image is determined so that the color shade of the contour is increased with an increase in the third contour value e3. Therefore, according to this embodiment, a contour can be drawn while changing the color shade of the contour, depending on the value of the change level. Data indicating the color value of each pixel of the contour image calculated in accordance with Expression (3) is stored as the contour image data 68 into the main memory.

In step S5, the CPU 10 displays the contour image on the screen of the television 2. Specifically, the contour image data 68 obtained by the process of step S4 is written into a frame buffer provided in the VRAM 11*d*, and the written contour image is output to the television 2.

In step S6, the CPU 10 determines whether or not the processes of steps S1 to S5 are ended. This determination process is performed by, for example, determining whether or not the player issues a command to end the game. When the determination result in step S6 is negative, the process of step S1 is executed again. Thereafter, the processes of steps S1 to S6 are repeatedly executed until it is determined in step S6 that the image generating process is ended. On the other hand, when the determination result in step S6 is positive, the CPU 10 ends the processes of FIG. 18.

According to the processes described above, the process of detecting a contour and generating a contour image based on an original image, which is generated for each frame, is repeated every frame. Here, in the above-described process, in step S1, an object may be moved or a virtual camera may be moved or rotated, so that the orientation of the object may vary with respect to the line-of-sight of the virtual camera. In this case, the value of the change level of a certain pixel varies from frame to frame, so that a new contour which has not been detected may be detected from a frame at a certain time. In other words, the value of the change level of a certain pixel may gradually increase as an object or a virtual camera is moved, so that the change level value may come to exceed a threshold value, and therefore, the pixel may be detected as a contour. In this case, the change level gradually increases, so that the contour value (third contour value) gradually increases from 0. Here, in this embodiment, as described in step S4, the larger the contour value, the darker the color shade of a contour. Therefore, when a new contour is displayed due to a change in the orientation of an object as described above, a contour having a lighter shade is initially displayed, and the contour is subsequently displayed so that the color shade gradually increases. Thus, according to this embodiment, when a new contour is drawn, the contour can be expressed so that the contour emerges gradually, but not suddenly. In other words, a contour can be displayed without giving a sense of discomfort to the viewer due to sudden emergence of a contour.

As described above, according to this embodiment, for an image of a three-dimensional space, the process of detecting a contour can be performed using the image itself. Thereby, a contour can be added to the image without newly producing another three-dimensional object for adding the contour. Therefore, since the number of times of processing relating to detection depends on the number of pixels, the processing amount of detection is not increased due to the number of objects or the data amount, thereby making it possible to reduce additional processing of a computer.

Also, according to the second method of this embodiment, a plurality of reference pixels are specified for a pixel of interest, and it is determined whether or not the pixel of interest corresponds to a contour, based on a change level which is a difference in Z value between the pixel of interest and the reference pixels. According to this, a contour can be more correctly detected than in the above-described first method, i.e., a method in which the determination is performed based on a difference in Z value between a pixel of interest and a single reference pixel.

(Variation Relating to Reference Pixel)

In the above-described embodiment, the game apparatus 3 specifies a plurality of sets of pixels as reference pixels for calculating the change level of a pixel of interest, where each set includes two pixels on opposite sides of and adjacent to the pixel of interest. Specifically, in order to cause the sets of reference pixels to have different directions from the pixel of interest to the reference pixels, a set of two pixels arranged in the lengthwise direction (two pixels above and below and adjacent to the pixel of interest) and a set of two pixels arranged in the widthwise direction (two pixels to the right and left of and adjacent to the pixel of interest) are specified. Here, two reference pixels which are specified as one set are preferably specified so that a pixel of interest is positioned at a center between the two reference pixels, in other words, the two reference pixels are symmetric about the pixel of interest (point symmetry). Thereby, the pixel of interest and the two reference pixels are arranged on a straight line, and the two reference pixels are equally distant from the pixel of interest, so that the change level can be correctly calculated from differences in Z value between the pixel of interest and the reference pixels. Note that, as a specific example in which a set of two pixels which are positioned symmetric about a pixel of interest (point symmetry) are specified as reference pixels, an example described below is contemplated in addition to the above-described embodiment.

Figure 23:
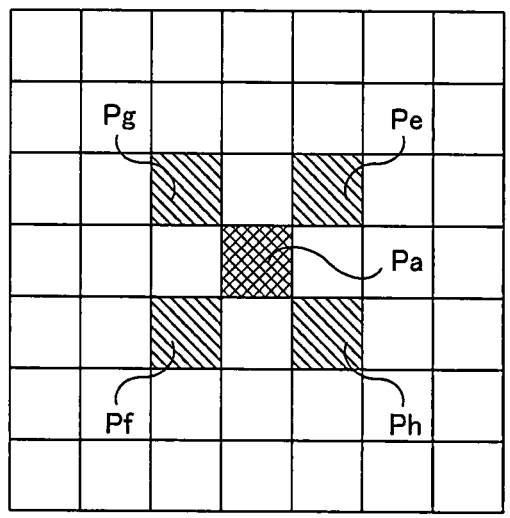
FIG. 23 is a diagram showing a relationship between a pixel of interest and reference pixels in another embodiment.

FIG. 23 is a diagram showing a relationship between a pixel of interest and reference pixels in another embodiment. Although it has been assumed in the above-described embodiment that two pixels arranged in the lengthwise direction are specified as a set of reference pixels and two pixels arranged in the widthwise direction are specified as another set of reference pixels, two pixels arranged in a slanting direction (positioned symmetric about a pixel of interest (point symmetry)) may be specified as reference pixels in another embodiment as shown in FIG. 23. Specifically, in the example of FIG. 23, pixels Pe, Pf, Pg and Ph present at slanting positions with respect to a pixel of interest Pa are specified as reference pixels. In this case, the game apparatus 3 calculates a contour value (fourth contour value) using the pixels Pe and Pf as a set of reference pixels, and a contour value (fifth contour value) using pixels Pg and Ph as another set of reference pixels. Further, in this case, the third contour value calculated in step S15 may be calculated based on the fourth and fifth contour values, or may be calculated based on the first, second, fourth and fifth contour values. In other words, the number of sets of reference pixels (each set includes two reference pixels) is not particularly limited.

Figure 24:
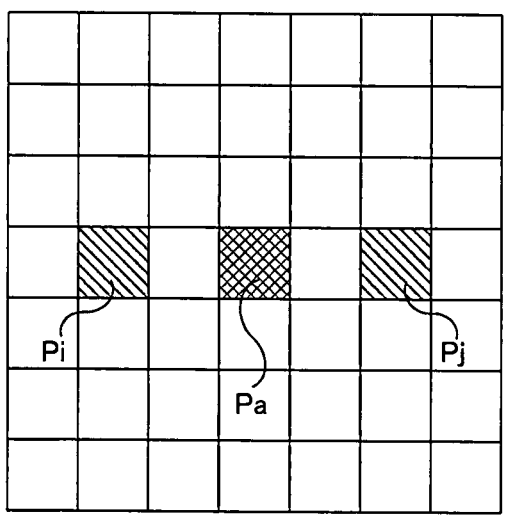
FIG. 24 is a diagram showing a relationship between a pixel of interest and reference pixels in another embodiment.

Also, in the above-described embodiment, the game apparatus 3 specifies pixels on opposite sides of and adjacent to a pixel of interest as a set of reference pixels. In another embodiment, reference pixels may not be adjacent to a pixel of interest. FIG. 24 is a diagram showing a relationship between a pixel of interest and reference pixels in another embodiment. As shown in FIG. 24, the reference pixels may be located a plurality of pixels (two pixels in FIG. 24) away from the pixel of interest.

Figure 25:
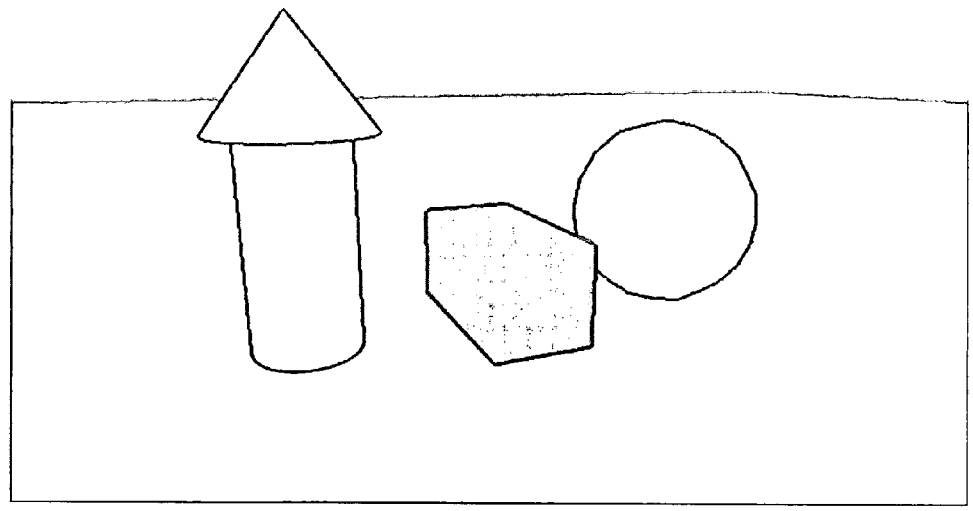
FIG. 25 is a diagram showing an exemplary contour image generated by a process of this embodiment.
Figure 26:
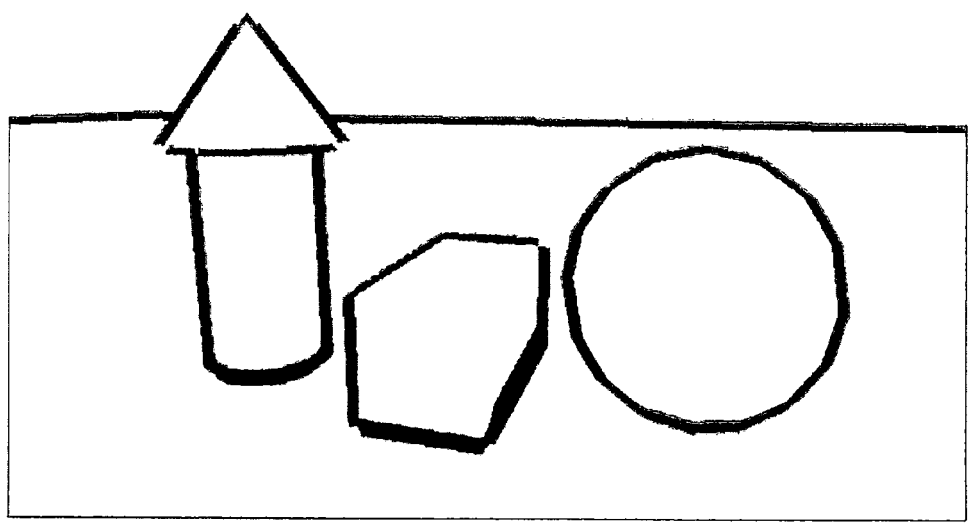
FIG. 26 is a diagram showing another exemplary contour image generated by a process of this embodiment.

Here, a width w between a pixel of interest and a reference pixel corresponds to a thickness of a contour. For example, when a pixel Pa of FIG. 24 is in a contour portion of an original object, pixels on opposite sides of and adjacent to the pixel Pa (i.e., Pi and Pj) often satisfy a condition for the determination. Therefore, the pixel Pa and both the adjacent pixels are all determined as pixels of a contour. Specifically, when a pixel which is located w pixels away from a pixel of interest is specified as a reference pixel, a contour having a thickness corresponding to w is drawn. FIGS. 25 and 26 are diagrams showing an exemplary contour image generated by the process of the above-described embodiment. FIG. 25 shows a contour image when the width w=1. FIG. 26 shows a contour image when the width w is set to be larger than 1. Note that the image of FIG. 25 is slightly different from the image of FIG. 26 in the position of a virtual camera. As can be seen from FIGS. 25 and 26, as the width w is increased, the thickness of a contour becomes larger. Therefore, according to this embodiment, the thickness of a contour can be easily changed by adjusting the width w between a pixel of interest and a reference pixel.

Figure 27:
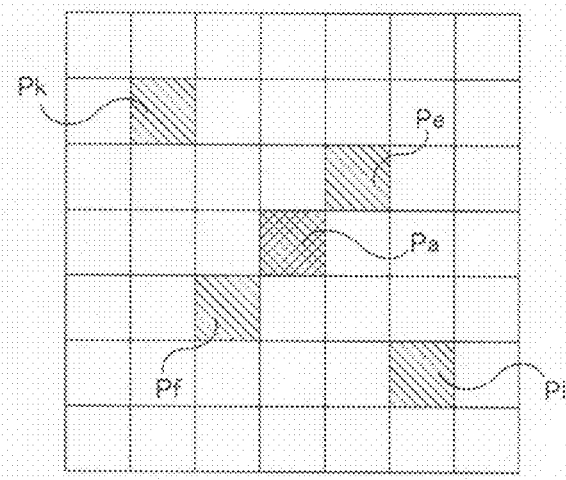
FIG. 27 is a diagram showing a relationship between a pixel of interest and reference pixels in another embodiment.
Figure 28:
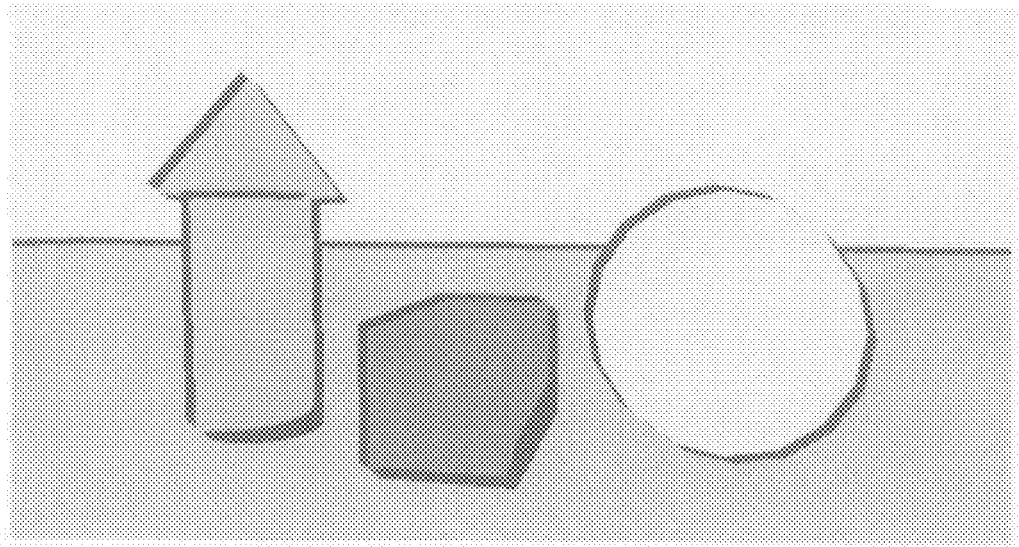
FIG. 28 is a diagram showing an exemplary contour image generated when a width w is changed, depending on a direction in which reference pixels are arranged.

Also, in another embodiment, the width w may be changed, depending on the reference pixel set. Specifically, the width w may be changed, depending on a direction in which two reference pixel included in one set are arranged. FIG. 27 is a diagram showing a relationship between a pixel of interest and reference pixels in another embodiment. In FIG. 27, regarding an upward and rightward direction and a downward and leftward direction with respect to a pixel of interest Pa, pixels Pe and Pf located one pixel away from the pixel of interest Pa are specified as a set of reference pixels. Regarding an upward and leftward direction and a downward and rightward direction with respect to the pixel of interest Pa, pixels Pk and P1 located two pixels away from the pixel of interest Pa are specified as a set of reference pixels. FIG. 28 is a diagram showing an exemplary contour image generated when the width w is changed, depending on a direction in which reference pixels are arranged. As shown in FIG. 28, when the width w is changed, depending on the direction, the thickness of a drawn contour is small in the upward and rightward direction and in the downward and leftward direction and is large in the upward and leftward direction and in the downward and rightward direction. Thus, according to this embodiment, by adjusting the width w, a contour can be represented as if it were drawn using a pen, such as a marker pen, which provides a line whose thickness varies depending on the drawing direction.

Also, in another embodiment, the condition under which it is determined whether or not a pixel of interest corresponds to a contour may be changed, depending on the reference pixel set. For example, when two pixels arranged in the lengthwise direction are specified as a set of reference pixels and two pixels arranged in the widthwise direction are specified as another set of reference pixels, the threshold value Zs may be changed between the process of calculating a contour value relating to the lengthwise direction and the process of calculating a contour value relating to the widthwise direction. More specifically, the threshold value Zs may be set to be relatively large in the process of calculating a contour value using reference pixels arranged in the lengthwise direction, while the threshold value Zs may be set to be relatively small in the process of calculating a contour value using reference pixels arranged in the widthwise direction. Thereby, a contour which varies depending on the direction can be expressed, as is similar to when the width w is adjusted.

Although it has been assumed above that a set of two pixels which are symmetric about a pixel of interest (point symmetry) are specified as reference pixels, the number of reference pixels which are used to calculate a contour value is not limited to two in other embodiments. For example, the game apparatus 3 may specify four pixels above and below and to the left and right of and adjacent to a pixel of interest (or eight pixels further including pixels in slanting directions with respect to the pixel of interest) as reference pixels, and calculate a change level using a difference between an average value of the Z values of the four pixels and the Z value of the pixel of interest. In this case, the game apparatus 3 does not calculate the first contour value or the second contour value, and sets a contour value calculated based on the calculated change level as the third contour value.

(Variation in which Contour is Added to a Portion of Original Image)

In the above-described embodiment, as an example, it has been assumed that the game apparatus 3 performs a process of adding a contour to the whole image. In another embodiment, a process of adding a contour only to a portion of an image (e.g., a specific object). For example, a contour is added to an object A while a contour is not added to an object B. In this case, the game apparatus 3 initially draws the object A and executes a process of adding a contour which is similar to that of the above-described embodiment, with respect to an image in which only the object A is drawn. Thereby, an image of the object A to which a contour is added is generated. The game apparatus 3 draws and overlays the object B on the image. Thereby, an image in which a contour is added only to the object A can be generated. Note that the game apparatus 3 may combine an image of the object A to which a contour is added with an image of the object B to generate an image in which a contour is added only to the object A.

Here, assuming that the object B is drawn and overlaid on the image of the object A to which a contour is added, for example, when the object B is located at a greater depth than that of the object A, a contour of the object A may be erased by the object B. Specifically, when a contour is added outside the object A, a contour of the object A is overwritten with the object B in a pixel in which the object B is drawn. In order to prevent this, when the image of the object A to which a contour is added is generated, the Z value of a pixel corresponding to the contour may be changed. Specifically, the game apparatus 3, when it is determined that a pixel of interest corresponds to a contour, sets the smallest one of the Z values of the reference pixels for the pixel of interest to be the Z value of the pixel of interest. Thereby, the Z value of a pixel corresponding to the contour of the object A becomes similar to the Z value of the object A, so that the color value of the pixel is not changed when the object B is drawn, leaving the correct contour.

(Exemplary Applications of Contour Detection)

In the above-described embodiment, the game apparatus 3 performs a process of detecting a pixel corresponding to a contour of all pixels of an original image (contour detecting process) and further adds a color of the contour to the detected pixel to generate a contour image (step S4). Here, the contour detecting process of this embodiment can be used for various purposes in addition to the generation of a contour image. For example, an image having only a contour(s) can be generated based on the detection result of the contour detecting process. Specifically, in step S4, the variable C1 in Expression (3) is used as a background color value, thereby making it possible to generate an image in which only a contour(s) is drawn.

Also, an antialiasing process can be performed with respect to an original image based on the detection result of the contour detecting process. Specifically, the game apparatus 3 performs a process of blurring an image with respect to pixels in an area which is determined in accordance with pixels which are detected as a contour of all pixels of an original image. Note that the pixel area which is subjected to the blurring process may be an area which includes only pixels which are detected as a contour, or an area which includes pixels which are detected as a contour and pixels located within a predetermined distance from the pixels. Thereby, by performing the blurring process only with respect to a contour portion (or a portion around a contour) of an original image, aliasing can be removed from that portion. As described above, the contour detecting process of this embodiment can also be used for various purposes in addition to the generation of a contour image.

Although it has been assumed in the above-described embodiment that the image generating process of generating a contour image is executed during a game process performed by the game apparatus 3, the present invention is not limited to game applications. The present invention is also applicable to various image processing apparatuses which execute a process of detecting a contour with respect to an image of a three-dimensional virtual space.

As described above, the present invention is applicable to a game apparatus and a game program which add a contour to an image, such as a game character or the like, and display the resultant image while preventing an increase in process load irrespective of the situation when a contour is detected in an image of a three-dimensional space.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium storing an image processing program which causes a computer to execute a process of generating an image of a three-dimensional virtual space, the image processing program causing the computer to execute:
    generating an image of a three-dimensional virtual space as viewed from a predetermined viewpoint, an object being provided in the three-dimensional virtual space;
    obtaining a depth value indicating a depth from the viewpoint in a line-of-sight direction in the three-dimensional virtual space for each pixel of the image; and
    detecting a pixel corresponding to a contour of the object based on the depth value including
        selecting a pixel of interest which is to be subjected to a process of determining whether or not the pixel corresponds to a contour, from all pixels of the image,
        specifying at least two reference pixels which are positioned symmetric about the pixel of interest, and
        determining whether or not the pixel of interest corresponds to a contour based on a difference in depth value between the pixel of interest and the reference pixels, wherein
    the computer determines whether or not the pixel of interest corresponds to a contour based on a change level of differences in depth value between the pixel of interest and the reference pixels, wherein
    in specifying the at least two reference pixels which are positioned symmetric about the pixel of interest, the computer specifies a plurality of sets of pixels, each set including two pixels positioned symmetric about the pixel of interest, so that directions from the pixel of interest to the pixels of each set are different from each other, and
    the computer calculates the change level for each pixel set, and based on the calculated change levels, determines whether or not the pixel of interest corresponds to a contour, wherein
    determining whether or not the pixel of interest corresponds to a contour includes:
        a first determination of calculating the change level for each pixel set, and based on the calculated change levels, preliminarily determining whether or not the pixel of interest corresponds to a contour for each pixel set; and
        a second determination of determining whether or not the pixel of interest corresponds to a contour, based on a result of the determination by the first determination, and wherein
    in the first determination, the computer uses different conditions predetermined for each direction from the pixel of interest to the sets of reference pixels, as determination conditions for preliminarily determining whether or not the pixel of interest corresponds to a contour, and wherein
    the different conditions for each direction comprise different threshold values relative to which the change level for each pixel set is compared to determine whether or not the pixel of interest corresponds to a contour for the pixel set.

2. The non-transitory storage medium according to claim 1, wherein
    the computer uses as the change level a difference between an average of the depth values of the reference pixels and the depth value of the pixel of interest to determine whether the pixel of interest corresponds to a contour.

3. The non-transitory storage medium according to claim 2, wherein
    the computer determines that the pixel of interest corresponds to a contour when a difference obtained by subtracting the depth value of the pixel of interest from the average of the depth values of the reference pixels is larger than a predetermined value.

4. The non-transitory storage medium according to claim 2, wherein
    the computer determines that the pixel of interest corresponds to a contour when a difference obtained by subtracting the average of the depth values of the reference pixels from the depth value of the pixel of interest is larger than a predetermined value.

5. The non-transitory storage medium according to claim 2, wherein
    the computer determines that the pixel of interest corresponds to a contour when the absolute value of a difference between the average of the depth values of the reference pixels and the depth value of the pixel of interest is larger than a predetermined value.

6. The non-transitory storage medium according to claim 1, wherein
    the computer uses as the change level a ratio of an average of the depth values of the reference pixels to the depth value of the pixel of interest to determine whether the pixel of interest corresponds to a contour.

7. The non-transitory storage medium according to claim 1, wherein
    for a pixel corresponding to a contour, the computer calculates a contour value indicating a shade of the contour, depending on the change level, and
    the image processing program causes the computer to further execute:
        drawing the contour with the shade corresponding to the contour value for a pixel which has been determined to correspond to the contour.

8. The non-transitory storage medium according to claim 1, wherein
    the computer specifies as reference pixels at least two pixels positioned symmetric about the pixel of interest and arranged in a lengthwise direction of the image and two pixels positioned symmetric about the pixel of interest and arranged in a widthwise direction of the image.

9. The non-transitory storage medium according to claim 1, wherein
the computer specifies as reference pixels at least two pixels positioned symmetric about the pixel of interest and arranged in a slanting direction of the image.

10. The non-transitory storage medium according to claim 1, wherein
the computer specifies reference pixels so that a distance from the pixel of interest to a reference pixel varies among the sets of reference pixels.

11. The non-transitory storage medium according to claim 1, wherein
the image processing program causes the computer to further execute:
drawing the image generated of the three-dimensional virtual space as viewed from a predetermined viewpoint, and performing a drawing process with respect to the pixel detected as corresponding to a contour of the object using a predetermined color.

12. The non-transitory storage medium according to claim 1, wherein
the image processing program causes the computer to further execute:
generating an image of only the detected contour.

13. The non-transitory storage medium according to claim 1, wherein
the image processing program causes the computer to further execute:
executing an antialiasing process with respect to a pixel in an area determined in accordance with the pixel detected as corresponding to a contour of the object.

14. The non-transitory storage medium according to claim 1, wherein
the computer obtains a Z value stored in a Z buffer as the depth value.

15. The non-transitory storage medium according to claim 1, wherein
the depth value represents a position in a depth direction from the viewpoint to an object drawn in a pixel in the virtual space.

16. The non-transitory storage medium according to claim 15, wherein
the computer obtains the depth value by converting a Z value stored in a Z buffer.

17. The non-transitory storage medium according to claim 1, wherein
the computer obtains a value stored in a W buffer as the depth value.

18. An image processing apparatus for generating an image of a three-dimensional virtual space, comprising a computer to execute:
generating an image of a three-dimensional virtual space as viewed from a predetermined viewpoint, an object being provided in the three-dimensional virtual space;
obtaining a depth value indicating a depth from the viewpoint in a line-of-sight direction in the three-dimensional virtual space for each pixel of the image; and
detecting a pixel corresponding to a contour of the object based on the depth value, including
selecting a pixel of interest which is to be subjected to a process of determining whether or not the pixel corresponds to a contour, from the pixels of the image,
specifying at least two reference pixels which are symmetric about the pixel of interest, and
determining whether or not the pixel of interest corresponds to a contour, based on a difference in depth value between the pixel of interest and the reference pixels, wherein
the computer determines whether or not the pixel of interest corresponds to a contour based on a change level of differences in depth value between the pixel of interest and the reference pixels, wherein
in specifying the at least two reference pixels which are positioned symmetric about the pixel of interest, the computer specifies a plurality of sets of pixels, each set including two pixels positioned symmetric about the pixel of interest, so that directions from the pixel of interest to the pixels of each set are different from each other, and
the computer calculates the change level for each pixel set, and based on the calculated change levels, determines whether or not the pixel of interest corresponds to a contour, wherein
determining whether or not the pixel of interest corresponds to a contour includes:
a first determination of calculating the change level for each pixel set, and based on the calculated change levels, preliminarily determining whether or not the pixel of interest corresponds to a contour for each pixel set; and
a second determination of determining whether or not the pixel of interest corresponds to a contour, based on a result of the determination by the first determination, wherein
in the first determination, the computer uses different conditions predetermined for each direction from the pixel of interest to the sets of reference pixels, as determination conditions for preliminarily determining whether or not the pixel of interest corresponds to a contour, and wherein
the different conditions for each direction comprise different threshold values relative to which the change level for each pixel set is compared to determine whether or not the pixel of interest corresponds to a contour for the pixel set.

19. The image processing apparatus according to claim 18, wherein
the detecting a pixel corresponding to a contour of the object based on the depth value uses as the change level a difference between an average of the depth values of the reference pixels and the depth value of the pixel of interest.

20. The image processing apparatus according to claim 18, wherein
the detecting a pixel corresponding to a contour of the object based on the depth value calculates, for a pixel corresponding to a contour, a contour value indicating a shade of the contour, depending on the change level, and
the computer of the image processing apparatus further executes:
contour image drawing for drawing the contour with the shade corresponding to the contour value for a pixel which has been determined to correspond to the contour.

21. The image processing apparatus according to claim 18, wherein
the specifying at least two reference pixels specifies reference pixels so that a distance from the pixel of interest to a reference pixel varies among the sets of reference pixels.

22. The image processing apparatus according to claim 18, wherein the computer further executes:
  contour image drawing for drawing the generated image, and performing a drawing process with respect to the detected pixel detected by the contour detector using a predetermined color.

23. A method of generating an image of a three-dimensional virtual space, comprising:
  generating an image of a three-dimensional virtual space as viewed from a predetermined viewpoint, an object being provided in the three-dimensional virtual space;
  obtaining a depth value indicating a depth from the viewpoint in a line-of-sight direction in the three-dimensional virtual space for each pixel of the image; and
  detecting a pixel corresponding to a contour of the object based on the depth value including
    selecting a pixel of interest which is to be subjected to a process of determining whether or not the pixel corresponds to a contour, from all pixels of the image,
    specifying at least two reference pixels which are positioned symmetric about the pixel of interest, and
  determining whether or not the pixel of interest corresponds to a contour based on a difference in depth value between the pixel of interest and the reference pixels, wherein
  the determining whether or not the pixel of interest corresponds to a contour is based on a change level of differences in depth value between the pixel of interest and the reference pixels, wherein
  the specifying the at least two reference pixels which are positioned symmetric about the pixel of interest, includes specifying a plurality of sets of pixels, each set including two pixels positioned symmetric about the pixel of interest, so that directions from the pixel of interest to the pixels of each set are different from each other, and
  calculating the change level for each pixel set, and based on the calculated change levels, determining whether or not the pixel of interest corresponds to a contour, wherein
  determining whether or not the pixel of interest corresponds to a contour includes:
    a first determination of calculating the change level for each pixel set, and based on the calculated change levels, preliminarily determining whether or not the pixel of interest corresponds to a contour for each pixel set; and
    a second determination of determining whether or not the pixel of interest corresponds to a contour, based on a result of the first determination, wherein
    in the first determination, using different conditions predetermined for each direction from the pixel of interest to the sets of reference pixels, as determination conditions for preliminarily determining whether or not the pixel of interest corresponds to a contour, and wherein
  the different conditions for each direction comprise different threshold values relative to which the change level for each pixel set is compared to determine whether or not the pixel of interest corresponds to a contour for the pixel set.

* * * * *